US011975805B2

(12) United States Patent
Hutchinson

(10) Patent No.: US 11,975,805 B2
(45) Date of Patent: May 7, 2024

(54) CARBON DIOXIDE TRANSPORT AND SEQUESTRATION MARINE VESSEL

(71) Applicant: StoreCo2 UK Limited, Cults (GB)

(72) Inventor: Keith William Hutchinson, Hebburn (GB)

(73) Assignee: StoreCo2 UK Limited, Aberdeen (GB)

( * ) Notice: Subject to any disclaimer, the term of this patent is extended or adjusted under 35 U.S.C. 154(b) by 0 days.

(21) Appl. No.: 18/484,535

(22) Filed: Oct. 11, 2023

(65) Prior Publication Data

US 2024/0034444 A1 Feb. 1, 2024

Related U.S. Application Data

(62) Division of application No. 18/181,649, filed on Mar. 10, 2023, now Pat. No. 11,827,317.
(Continued)

(51) Int. Cl.
*B63B 35/44* (2006.01)
*B63B 25/14* (2006.01)
(Continued)

(52) U.S. Cl.
CPC .............. *B63B 35/44* (2013.01); *B63B 25/14* (2013.01); *B63B 27/34* (2013.01); *B63H 21/14* (2013.01);
(Continued)

(58) Field of Classification Search
CPC ..... B63B 35/44; B63H 21/14; E21B 41/0064; F17C 5/06
See application file for complete search history.

(56) References Cited

U.S. PATENT DOCUMENTS 2,985,131 A * 5/1961 Knight, Jr. .............. B63B 27/12 114/72
3,332,386 A * 7/1967 Massac .................. F17C 3/025 220/560.07
(Continued)

FOREIGN PATENT DOCUMENTS

AU 2008324194 A1 * 4/2010 ............. F25J 1/0022
AU 2014251176 A1 * 10/2015 ............. B63B 27/34
(Continued)

OTHER PUBLICATIONS

Invitation to Pay Additional Fees issued for International Patent Application No. PCT/IB2023/052328, dated Jul. 5, 2023, 18 pages.
(Continued)

*Primary Examiner* — S. Joseph Morano
*Assistant Examiner* — Jovon E Hayes
(74) *Attorney, Agent, or Firm* — Haynes and Boone, LLP

(57) ABSTRACT

A marine vessel and method for carbon capture and sequestration are described. The marine vessel includes a buoyant hull, a cryogenic storage tank within the hull, and a gaseous carbon dioxide loading manifold. The marine vessel also includes a carbon dioxide liquefaction system in fluid communication with the cryogenic storage tank downstream of the carbon dioxide liquefaction system and with the gaseous carbon dioxide loading manifold upstream of the carbon dioxide liquefaction system. Finally, the marine vessel includes a carbon dioxide supercritical system in fluid communication with the cryogenic storage tank. In operation, the marine vessel moves between multiple locations, where gaseous carbon dioxide is onboarded, liquified and stored. Thereafter, the marine vessel transports the liquified carbon dioxide to a location adjacent an offshore geological reservoir. The liquefied carbon dioxide is then pressurized to
(Continued)

produce supercritical carbon dioxide, which is then injected directly into the reservoir from the marine vessel.

30 Claims, 11 Drawing Sheets

Related U.S. Application Data

(60) Provisional application No. 63/364,135, filed on May 4, 2022.

(51) Int. Cl.

| | |
|---|---|
| ***B63B 27/34*** | (2006.01) |
| ***B63H 21/14*** | (2006.01) |
| ***B63H 21/16*** | (2006.01) |
| ***B63H 21/32*** | (2006.01) |
| ***E21B 41/00*** | (2006.01) |
| ***F17C 5/06*** | (2006.01) |

(52) U.S. Cl.

CPC ............. *B63H 21/16* (2013.01); *B63H 21/32* (2013.01); *E21B 41/0007* (2013.01); *E21B 41/0064* (2013.01); *F17C 5/06* (2013.01); *B63B 2035/448* (2013.01); *F17C 2221/013* (2013.01); *F17C 2223/0123* (2013.01); *F17C 2225/013* (2013.01); *F17C 2227/0135* (2013.01); *F17C 2227/0157* (2013.01); *F17C 2227/0302* (2013.01); *F17C 2265/066* (2013.01); *F17C 2270/0105* (2013.01)

(56) References Cited

U.S. PATENT DOCUMENTS

| | | | | |
|---|---|---|---|---|
| 5,095,836 | A * | 3/1992 | Gallagher | B63B 25/082 137/590 |
| 10,710,682 | B1 * | 7/2020 | Mermiris | B63B 3/48 |
| 2014/0060111 | A1 * | 3/2014 | Bauer | F25J 1/0092 62/611 |
| 2017/0167787 | A1 * | 6/2017 | Pierre, Jr. | F25J 1/0277 |
| 2023/0103018 | A1 | 3/2023 | Holck | |

FOREIGN PATENT DOCUMENTS

| | | | | |
|---|---|---|---|---|
| AU | 2011209867 | B2 * | 5/2016 | F25J 1/0022 |
| CN | 115385126 | A * | 11/2022 | B63B 35/44 |
| CN | 116573107 | A * | 8/2023 | B63B 35/44 |
| EP | 2253796 | A1 * | 11/2010 | E21B 17/015 |
| KR | 20150086641 | A | 7/2015 | |
| WO | WO-9713109 | A1 * | 4/1997 | F25J 1/0022 |
| WO | WO-2011101461 | A1 * | 8/2011 | B63B 25/16 |
| WO | WO 2013/025108 | A1 | 2/2013 | |
| WO | WO-2017105681 | A1 * | 6/2017 | B63B 21/507 |
| WO | WO 2018/234721 | A1 | 12/2018 | |
| WO | WO 2019/195557 | A2 | 10/2019 | |
| WO | WO-2022250078 | A1 * | 12/2022 | B63B 35/44 |

OTHER PUBLICATIONS

Search Report and Written Opinion issued for International Patent Application No. PCT/IB2023/052328, dated Aug. 29, 2023, 21 pages.

* cited by examiner

CARBON DIOXIDE TRANSPORT AND SEQUESTRATION MARINE VESSEL

PRIORITY CLAIM

This application is a divisional application of U.S. Non-Provisional application Ser. No. 18/181,649, filed Mar. 10, 2023, which claims the benefit of priority to U.S. Provisional Application No. 63/364,135, filed May 4, 2022, the benefit of which is claimed and the disclosures of which are incorporated by reference in their entirety.

FIELD OF THE INVENTION

The present disclosure generally relates to carbon dioxide collection, handling, transport and sequestration in offshore subsea reservoirs.

BACKGROUND OF THE INVENTION

Carbon dioxide ($CO_2$) is a common byproduct from the combustion of fossil fuels in industrial processes. Traditionally, carbon dioxide resulting from these industrial processes has simply been released into the atmosphere at the location where the carbon dioxide is produced. More recently, attempts have been made to remove or 'capture' carbon dioxide from these industrial processes in order to keep carbon dioxide emissions out of the atmosphere. This is typically accomplished with a scrubber system that removes carbon dioxide from the flue gas resulting from these industrial processes. But separating the captured carbon dioxide gas and storing it can be costly, and thus, many industrial facilities may not have such systems in place. Moreover, even where carbon dioxide is scrubbed from flue gas, the captured carbon dioxide must be transported to a facility for long-term storage, i.e., sequestration, such as in underground geological formations, utilizing pipelines, pumping stations, vehicles and the like. In some instances where the captured carbon dioxide is to be transported by marine vessel, it may be converted locally, or along a conveyance pipeline, by a liquification facility into liquid carbon dioxide, after which the liquified carbon dioxide may be loaded onto a marine vessel for transport to a sequestration site. It will be appreciated that liquification facilities are capital intensive investments and thus, not necessarily feasible for all producers of carbon dioxide from industrial processes. Thus, the significant costs associated with scrubbing carbon dioxide from flue gas and liquifying carbon dioxide for marine transportation can diminish the motivation to capture carbon dioxide from flue gases for sequestration in the first place.

BRIEF DESCRIPTION OF THE DRAWINGS

For a more complete understanding of the present disclosure and its features and advantages, reference is now made to the following description, taken in conjunction with the accompanying drawings, in which.

DESCRIPTION

Disclosed herein is a carbon dioxide transport and sequestration marine vessel disposed for shallow water ports and hence short voyages from the coast out to offshore hydrocarbon platforms which are typically approximately 200 miles from shore or less, however, the carbon dioxide transport and sequestration marine vessel may also undertake longer voyages. This is in contrast to liquified gas carriers that may, require deepwater ports and may travel thousands of miles in a typical voyage. The carbon dioxide transport and sequestration marine vessel disclosed herein is a self-propelled, buoyant vessel having a carbon dioxide liquefaction system in fluid communication with one or more liquified carbon dioxide storage tanks within the hull of the marine vessel. The marine vessel includes a gaseous carbon dioxide loading manifold for loading gaseous carbon dioxide for processing by the carbon dioxide liquefaction system. In one or more embodiments, the marine vessel may also include manifolds for loading liquified carbon dioxide. In one or more embodiments, the carbon dioxide transport and sequestration marine vessel also includes a carbon dioxide supercritical system downstream of the liquified carbon dioxide storage tanks which carbon dioxide supercritical system is disposed to transform the liquified carbon dioxide to supercritical carbon dioxide for injection into an offshore, subsea reservoir. In one or more embodiments, a marine vessel may include a water ballast system where the volume of the water ballast is tanks is equal to or greater than the liquid cargo tanks where the water ballast tanks are positioned within the hull to minimize draft in order to permit a marine vessel to access shallow water ports. In one or more embodiments, a marine vessel may include a carbon dioxide capture system and an exhaust gas heat recovery system to enable efficient regeneration of the carbon capture system.

Figure 1:
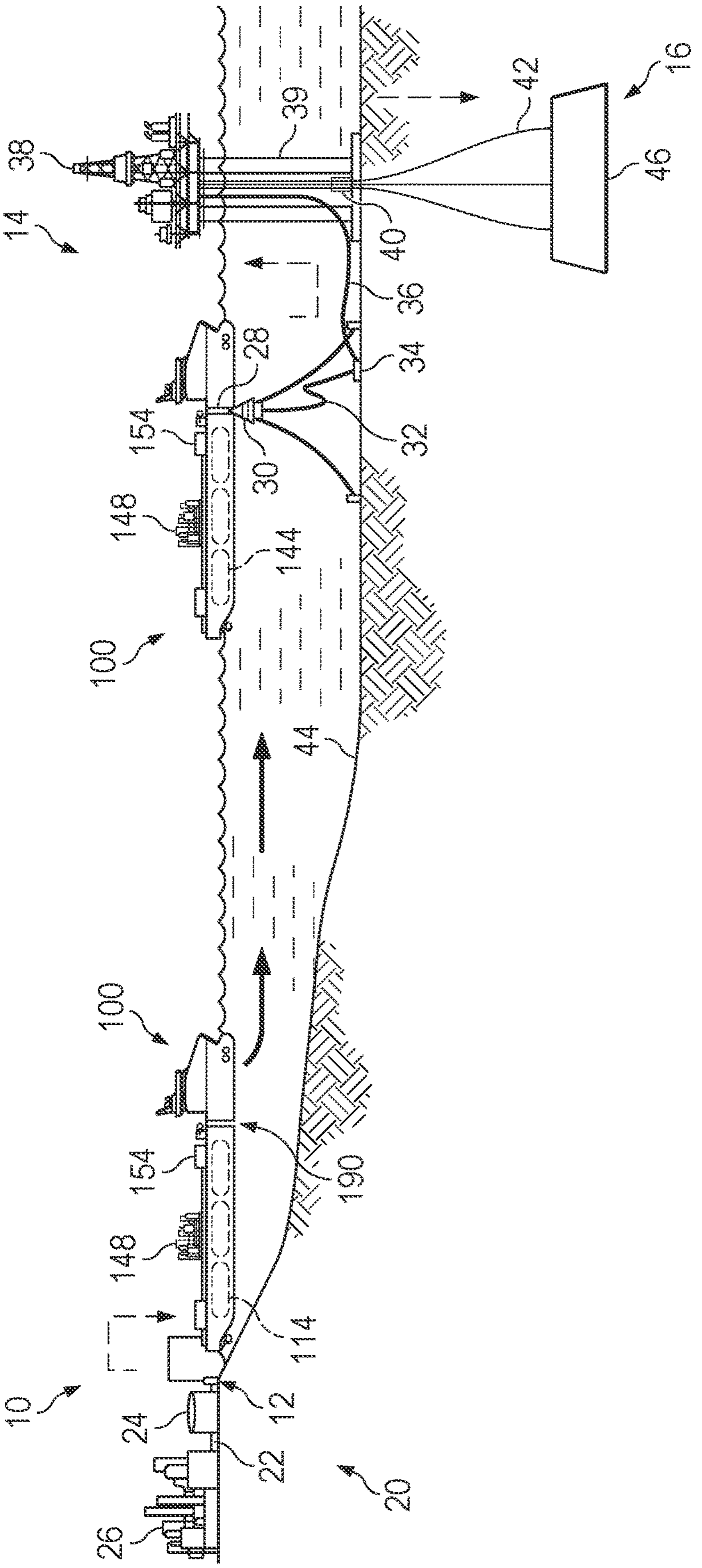
FIG. 1 is a schematic representation of a marine liquefaction transportation and injection system supply chain.

With reference to FIG. 1, a carbon capture and sequestration marine vessel 100 is provided to liquefy, transport, and inject carbon dioxide. The carbon dioxide transport and sequestration marine vessel 100 includes an onboard liquification system 148 and a carbon dioxide supercritical system 154. In one or more embodiments, the carbon dioxide transport and sequestration marine vessel 100 moves between i) a first location 10 having a loading (onboarding)

terminal(s) 12 where the carbon dioxide transport and sequestration marine vessel 100 is docked and receives gaseous carbon dioxide and ii) a second location 14 having a storage facility(s) 16 where the carbon dioxide transport and sequestration marine vessel 100 transfers supercritical carbon dioxide to the storage facility 16. In one or more embodiments, the storage facility 16 is offshore and may be a depleted hydrocarbon reservoir, such as a subsea reservoir that has been repurposed upon reaching end of life use in the production of hydrocarbons. In other embodiments, the storage facility 16 may be on shore or offshore storage tanks. FIG. 1 illustrates storage facility 16 as a subsea reservoir 46. In any event, by having a liquefaction system 148 onboard, the carbon dioxide transport and sequestration marine vessel 100 can gather carbon dioxide at any marine terminal as opposed to marine terminals designed to locally liquefy and store carbon dioxide, it being understood that such liquefaction and storage facilities are capital intensive and thus not readily installed at most marine terminals.

At a first location 10, gaseous carbon dioxide is loaded onto the carbon dioxide transport and sequestration marine vessel 100 at ambient temperature and pipeline pressure. The carbon dioxide may be delivered to the carbon dioxide transport and sequestration marine vessel 100 from a gaseous carbon dioxide source 20 such as a pipeline 22, gaseous carbon dioxide storage tanks 24 or a carbon dioxide capture facility 26 where carbon dioxide is separated from exhaust flue gases. The separated carbon dioxide may be dried to remove water content, either onboard carbon dioxide transport and sequestration marine vessel 100 or at the carbon dioxide capture facility 26 and/or a low-pressure pipeline to a loading port or nearshore location.

Onboard the carbon dioxide transport and sequestration marine vessel 100, utilizing onboard liquefaction system 148, a direct liquefaction process converts the gaseous carbon dioxide collected at the first location 10 into a cryogenic liquid, thereby reducing the volume of carbon dioxide and stabilizing the liquid at a desired temperature and elevated pressure so that it can be contained and transported in one or more International Marine Organization (IMO) Type 'C' liquified carbon dioxide storage tanks 144 onboard carbon dioxide transport and sequestration marine vessel 100 rated for both reduced temperature and elevated pressure. In one or more embodiments, the liquified carbon dioxide stored onboard the carbon dioxide transport and sequestration marine vessel 100 may have a temperature of approximately minus 28 degrees Celsius and a pressure of approximately 15 bar for storage. Thus, in contrast to storage tanks for other types of cryogenic liquids such as liquified natural gas, which can be stored at atmospheric pressure, storage of liquified carbon dioxide requires pressurized storage tanks and thus, may be limited in physical size, i.e., storage capacity. In some embodiments, the total maximum net cargo capacity of all liquified carbon dioxide storage tanks 144 onboard carbon dioxide transport and sequestration marine vessel 100 is approximately 30,000 cubic meters at 90% filling ratio, where each liquified carbon dioxide storage tank 144 has a cargo capacity of approximately 3,700 cubic meters at 100% filling ratio. Each liquified carbon dioxide cargo storage tank 144 may have one or more cryogenic liquid cargo pumps (see FIG. 10*a*, pumps 173). In some embodiments, the liquid cargo storage tanks 144 can store liquid at temperatures as low as −55 to −28 degrees Celsius. In some embodiments, the liquified cargo storage tanks 144 can store liquid at pressures between at least 5 bar and 20 bar.

Once the one or more liquified carbon dioxide storage tanks 144 have been charged with liquid carbon dioxide, the carbon dioxide transport and sequestration marine vessel 100 may move to i) one or more additional collection sites if the liquid carbon dioxide storage tanks 144 still have capacity to receive additional the liquified carbon dioxide, or alternatively, ii) a second location 14, such as adjacent offshore storage facility 16.

While the first location 10 is described in embodiments as a shallow water port adjacent land-based facilities where carbon dioxide transport and sequestration marine vessel 100 is docked, in other embodiments, the first location 10 may be an offshore loading terminal in fluid communication with a gaseous carbon dioxide pipeline where transport and sequestration marine vessel 100 may be moored adjacent the offloading terminal. Moreover, descriptions of any marine vessel being docked herein include mooring of the vessel at a location.

At the second location 14, the carbon dioxide transport and sequestration marine vessel 100 utilizes supercritical system 154 to unload the liquefied carbon dioxide via an export manifold 28 (see FIGS. 1, 2, 3, 4 and 5). In one or more embodiments, the export manifold 28 is in fluid communication with a conveyance system 30 for delivering supercritical carbon dioxide to a destination, such as storage facility 16. In one or more embodiments, conveyance system 30 may be deployed underwater and may be in fluid communication with one or more wellheads 40 for injecting the supercritical carbon dioxide via wellbores 42 into a subsea reservoir 46. In other embodiments, conveyance system 30 may be above water and disposed to deliver liquified carbon dioxide to another destination, such as land-based storage tanks or marine or offshore storage tanks external to carbon dioxide transport and sequestration marine vessel 100 or a pipeline for delivery to an industrial customer. Although not limited to a particular configuration, where conveyance system 30 is an underwater conveyance system, it may include a PLEM (pipeline end manifold) 32 to which one or more risers 34 may attach. To further facilitate coupling with the export manifold 28, underwater conveyance system 30 may include a submerged buoy 36 in fluid communication with PLEM 32 via risers 34. In such case, risers 34 may be flexible risers to accommodate movement of submerged buoy 36. Conveyance system 30 may also deliver the super critical carbon dioxide to a platform 38, via flowlines 35, from which the carbon dioxide can be directed to storage facility 16. Although various components of a conveyance system 30 have been described, it will be appreciated that conveyance system 30 is not limited to a particular unloading system.

In any event, prior to unloading, the temperature and pressure of the liquid carbon dioxide is raised above the critical point for carbon dioxide, thereby transforming the carbon dioxide into a supercritical fluid. In this regard, carbon dioxide transport and sequestration marine vessel 100 includes an on-board carbon dioxide supercritical system 154 (see FIG. 7 which may also be referred to as a carbon dioxide injection system and is described in more detail below) that includes high-pressure liquid pumps 155 to increase the pressure of the liquid carbon dioxide to approximately 200 bar, thereby serving the dual purpose of raising the pressure to a desired export pressure for injection purposes and at the same time transforming the liquid carbon dioxide into supercritical carbon dioxide. The carbon dioxide supercritical system 154 may also include trim heaters that maintain the supercritical carbon dioxide just above the critical temperature 31 degrees Celsius) for offloading and injection. Thus, the components of the carbon dioxide supercritical system 154 used to convert the liquid carbon dioxide to supercritical carbon dioxide also function as an injection system, it being appreciated that carbon dioxide in supercritical state has the density of a liquid and the fluid properties of a gas making it ideal for introduction back into geological structures that have previously held hydrocarbons.

Figure 2:
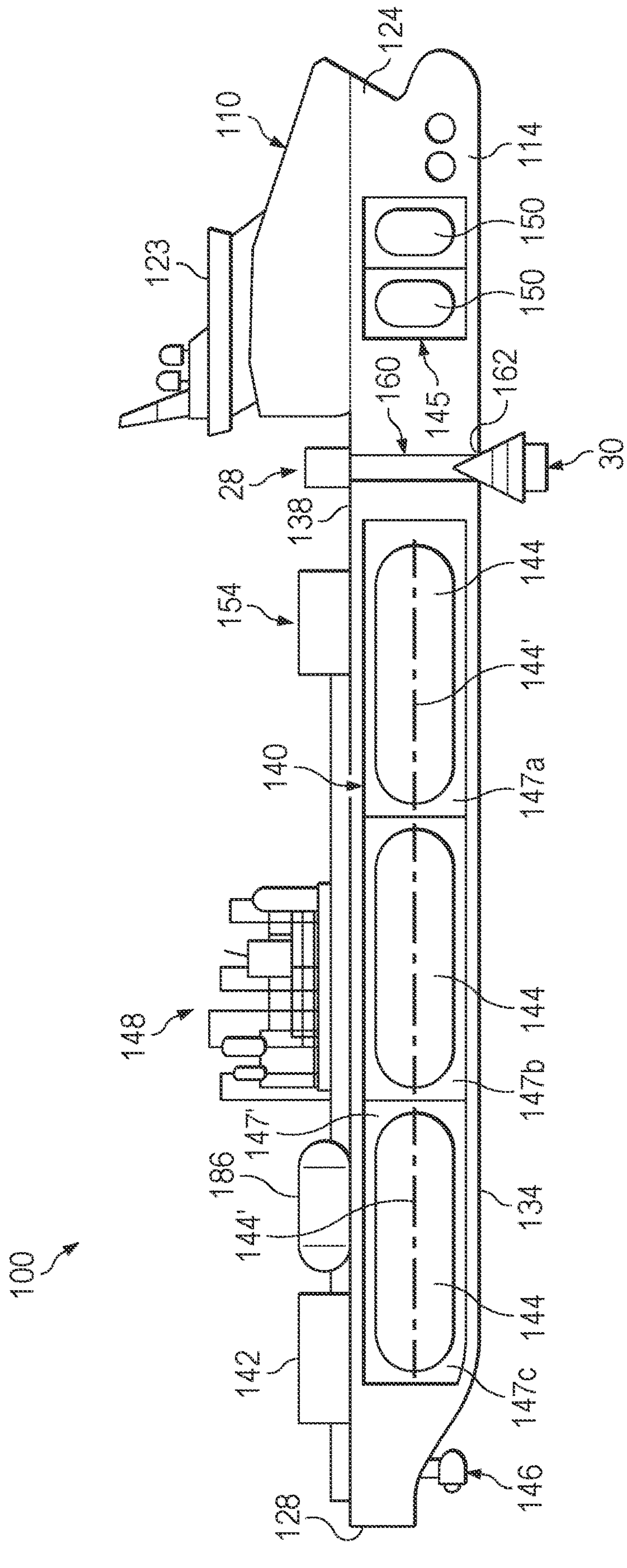
FIG. 2 is a partial cut-away side elevation/profile view of a marine liquefaction transportation and injection vessel.
Figure 3:
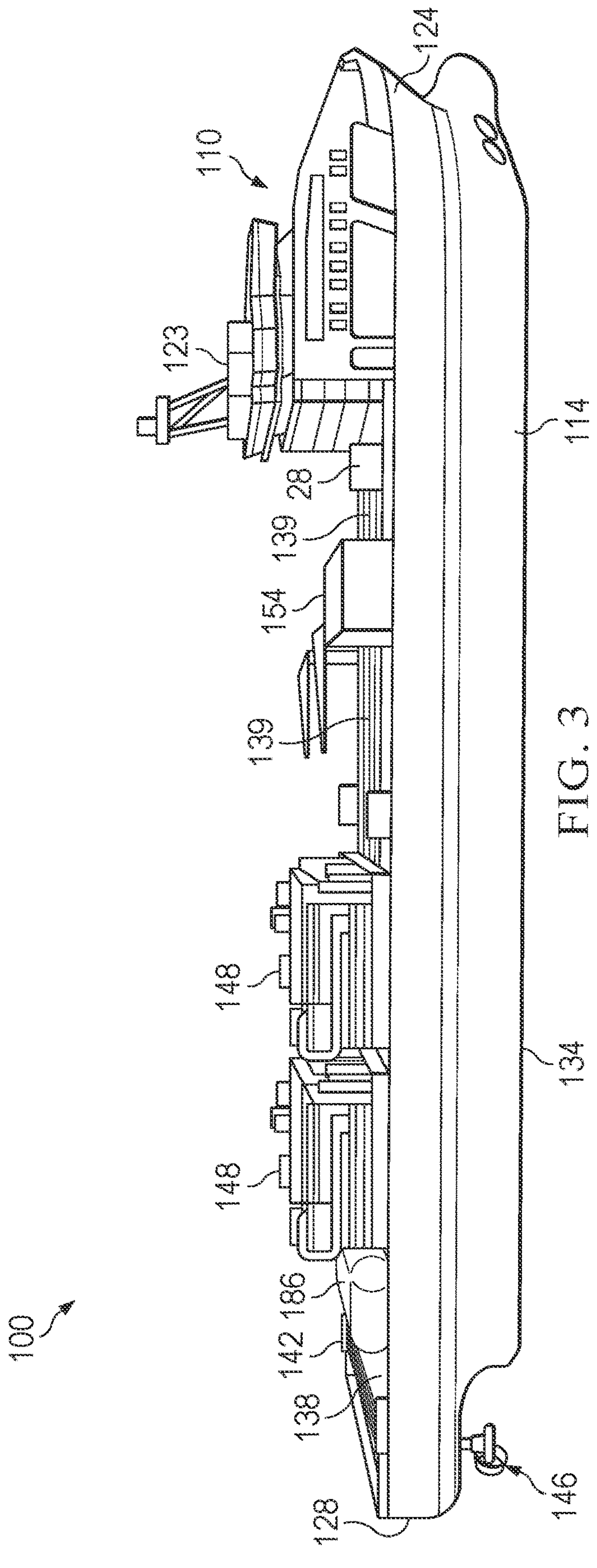
FIG. 3 is a 3-dimensional perspective view of the marine liquefaction transportation and injection vessel of FIG. 2.
Figure 4:
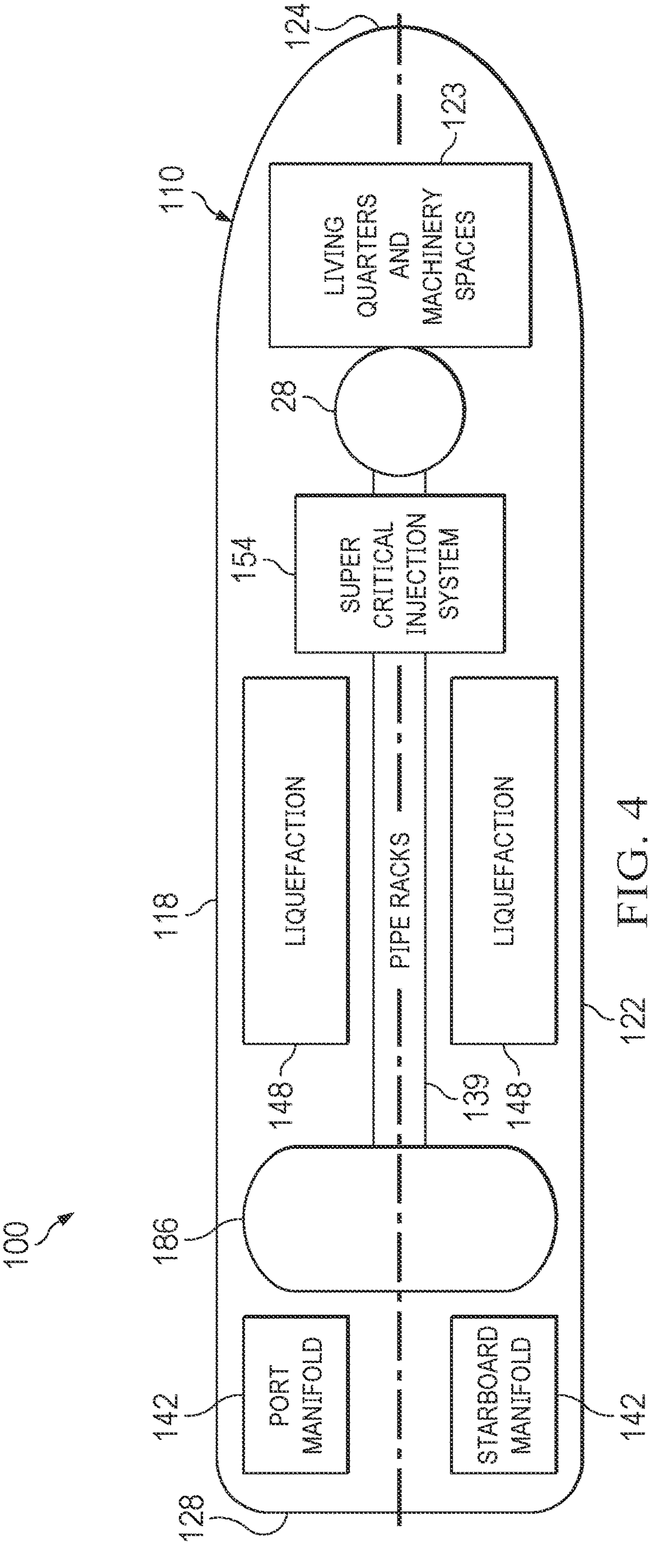
FIG. 4 is a plan view of the upper deck of a marine liquefaction transportation and injection vessel.

With reference to FIGS. 2, 3 and 4, marine vessel 100 for carbon capture and sequestration is shown in more detail. Generally, the carbon dioxide transport and sequestration marine vessel 100 includes a self-propelled, buoyant vessel 110 having an elongated hull 114 with a first hull side 118 and an opposing second hull side 122. The elongated hull 114 includes a first hull end 124 and a second hull end 128 and extends along a centerline plane 130 from the first hull end 124 to the second hull end 128 between the two hull sides 118 and 122 substantially bisecting the hull 114. Hull 114 may include a keel 134 extending between the first and second hull ends 124 and 128. Carbon dioxide transport and sequestration marine vessel 100 also includes an upper deck 138 extending between the hull sides 118 and 122 so as to define a hull volume 140 within the hull 114.

At least one liquified carbon dioxide storage tank 144 is disposed within the hull 114. In one or more embodiments described in more detail below, a plurality of liquified carbon dioxide storage tanks 144 may be deployed within the hull volume 140 defined by hull 114. In one or more embodiments, the liquified carbon dioxide storage tanks 144 disposed within the hull 114 extend from adjacent the keel 134 to adjacent the upper deck 138. Because carbon dioxide transport and sequestration marine vessel 100 is being utilized to store and transport liquefied carbon dioxide, it will be appreciated that liquified carbon dioxide storage tanks 144 may fill at least twenty-five percent of the hull volume 140 in some embodiments, and at least fifty percent of the hull volume 140, it being appreciated that because marine vessel 100 is a transport ship, a significant amount of the total hull volume 140 is utilized for storage of liquid cargo such as liquid carbon dioxide. In some embodiments, liquified carbon dioxide storage tanks 144 may fill at least 30 percent of the hull volume 140, while in other embodiments, liquified carbon dioxide storage tanks 144 may fill at least 50 percent of the hull volume 140, while in other embodiments, liquified carbon dioxide storage tanks 144 may fill at least 60 percent of the hull volume 140 if not more.

Carbon dioxide transport and sequestration marine vessel 100 may also include a consumables storage bunker 145 within hull 114 with one or more liquid consumables storage tanks 150 disposed therein for storing liquid consumables such as fuels, oils, non-ballast waters.

Carbon dioxide transport and sequestration marine vessel 100 also includes a carbon dioxide liquefaction system 148 carried by the buoyant vessel 110. Carbon dioxide liquefaction system 148 is in fluid communication with liquified carbon dioxide storage tanks 144 in order to supply liquified carbon dioxide to the liquified carbon dioxide storage tanks 144 once gaseous carbon dioxide is processed by the liquefaction system 148. In one or more embodiments, carbon dioxide liquefaction system 148 is positioned on or above upper deck 138 and above liquid cargo storage tanks 144. In some embodiments, carbon dioxide liquefaction system 148 is modular to allow it to be installed along upper deck 138 as a unit, thereby enhancing the retrofit of repurposed marine vessels. In other embodiments, the carbon dioxide liquefaction system 148 is positioned at least partially within the hull 114, and in further embodiments the carbon dioxide liquefaction system 148 is positioned wholly within the hull 114.

One or more storage tank cargo holds 147 are defined within hull 114, each storage tank cargo hold 147 having a volume 147'. In the illustrated embodiment, three storage tank cargo holds 147*a*, 147*b* and 147*c* are shown, each with at least one liquefied carbon dioxide storage tank 144 disposed therein. In one or more embodiments, the liquified carbon dioxide storage tanks 144 disposed within a storage tank cargo hold 147 fills at least 50% of the volume 147' of the storage tank cargo hold 147 in which the liquefied carbon dioxide storage tank(s) 144 is disposed. In one or more embodiments, the liquified carbon dioxide storage tanks 144 disposed within a storage tank cargo hold 147 fills at least 80% of the volume 147' of the hold 147 in which the liquefied carbon dioxide storage tank(s) 144 is disposed. In any event, while some embodiments are not limited to a particular number of storage tank cargo holds 147 or liquified carbon dioxide storage tanks 144, it has been found that in one embodiment carbon dioxide transport and sequestration marine vessel 100 is optimized for shallow water ports and short sea voyages between a first location 10 and a second location 14 (as described above) by utilizing three storage tank cargo holds 147, with each storage tank cargo hold 147 having three IMO Type 'C' cryogenic liquified carbon dioxide storage tanks 144 of the standard maximum size for such tanks of approximately 10 meters in diameter and approximately 48 meters long with an approximate volume of 3,000 cubic meters. Thus, in one or more embodiments, liquified carbon dioxide storage tanks 144 are elongated and cylindrical and extend parallel with centerline plane 130 of carbon dioxide transport and sequestration marine vessel 100.

As noted above, in one or more embodiments, carbon dioxide transport and sequestration marine vessel 100 may be self-propelled and include a propulsion system 146 and maneuvering systems, such as rudders; azimuthing thrusters, tunnel thrusters, etc., to provide steerage and maneuvering/positioning when inshore/nearshore/offshore. Propulsion system 146 is not limited to any particular propulsion system and may include one or more types of engines 149 as described below, as well as shafting, gearboxes, generators, batteries, electric motors, propulsors, etc. In any event, propulsion system 146 permits carbon dioxide transport and sequestration marine vessel 100 to travel from the various locations described above under its own power and to readily access shallow water ports and waterside coastal facilities to receive gaseous, and also liquid, carbon dioxide and also discharge supercritical or liquid carbon dioxide offshore or nearshore/inshore.

Carbon dioxide transport and sequestration marine vessel 100 may further include a carbon dioxide supercritical system 154 to pressurize liquid carbon dioxide from liquified carbon dioxide cargo storage tanks 144 prior to offloading the stored carbon dioxide. In one or more embodiments, carbon dioxide supercritical system 154 is positioned on or above upper deck 138. In some embodiments, carbon dioxide supercritical system 154 is modular to allow it to be installed along upper deck 138 as a unit, thereby enhancing the retrofit of repurposed marine vessels. In some embodiments, the carbon dioxide supercritical system 154 is positioned along upper deck 138 above the liquified carbon dioxide storage tanks 144. In other embodiments, the carbon dioxide supercritical system 154 may be positioned at least partially within the hull 114, while in further embodiments, the carbon dioxide supercritical system 154 may be positioned wholly within the hull 114.

Carbon dioxide transport and sequestration marine vessel 100 may include pipework 139 extending along upper deck 138 to interconnect the carbon dioxide liquefaction system 148 and the liquified carbon dioxide storage tanks 144, as well as to interconnect the liquified carbon dioxide storage tanks 144 with the carbon dioxide supercritical system 154.

In one or more embodiments, carbon dioxide transport and sequestration marine vessel 100 includes a gaseous carbon dioxide loading manifold 142 for loading gaseous carbon dioxide as described above. Loading manifold 142 may be in fluid communication with the carbon dioxide liquefaction system 148 to permit gaseous carbon dioxide to be liquified as it is pumped on board. In this regard, loading manifold 142 may be coupled to a gaseous carbon dioxide source 20 (see FIG. 1). In any event, in one or more embodiments, as gaseous carbon dioxide is on-boarded via loading manifold 142, it is liquified by carbon dioxide liquefaction system 148 prior to on-board storage in liquified carbon dioxide storage tanks 144. In other embodiments, prior to liquefaction, onboarded gaseous carbon dioxide may be temporality stored in onboard carbon dioxide temporary storage tanks 186. Onboard gaseous carbon dioxide temporary storage tanks 186 may be particularly useful where small volumes of gaseous carbon dioxide are collected from a number of locations, until a sufficient volume of gaseous carbon dioxide has been collected for liquefication. Moreover, it will be appreciated that gaseous carbon dioxide may arrive at a loading port location at different pressures, depending, for example, on the distance through which the gaseous carbon dioxide has been pumped, it being understood that gas pumped from greater distances may have a greater head pressure when arriving at the loading location. Thus, in some embodiments, carbon dioxide temporary storage tanks 186 may function as temporary collection and stabilization tanks, permitting carbon dioxide at different pressures to be readily onboarded by loading manifold 142 without the need for different equipment to handle different pressures. In such case, onboard carbon dioxide temporary storage tanks 186 allow the gaseous carbon dioxide to be stabilized at a predetermined pressure before being directed to the carbon dioxide liquefaction system 148.

Likewise, in one or more embodiments, carbon dioxide transport and sequestration marine vessel 100 includes an export manifold 28 for offloading supercritical carbon dioxide. Export manifold 28 may be in fluid communication with carbon dioxide supercritical system 154 to permit supercritical carbon dioxide to be injected into a storage facility 16 as described above.

The carbon dioxide transport and sequestration marine vessel 100 also includes a multi-deck accommodation structure 123 positioned along upper deck 138. In one or more embodiments, multi-deck accommodation structure 123 is positioned along upper deck 138 so as to be adjacent to the first hull end 124, i.e., the bow, of elongated hull 114. In other embodiments, multi-deck accommodation structure 123 may be positioned adjacent the second hull end 128, i.e., the stem, above the propulsion system 146.

In one or more embodiments, the carbon dioxide transport and sequestration marine vessel 100 may include a submerged buoy coupling system 160 to offload supercritical carbon dioxide for injection, or liquid carbon dioxide for storage etc. The submerged buoy coupling system 160 is provided to fluidically couple the export manifold 28 with an underwater conveyance system 30 extending from the carbon dioxide transport and sequestration marine vessel 100 to a carbon dioxide injection wellhead 40. In this regard, underwater conveyance system 30 may include submerged buoy 36 and underwater risers 34 (see FIG. 1) to allow supercritical carbon dioxide to be pumped to wellhead 40 for injection. The submerged buoy coupling system 160 may include an opening 162 selected to be below the waterline of carbon dioxide transport and sequestration marine vessel 100, such as a moon pool, in the bottom or a lower portion of elongated hull 114 to permit retrieval and engagement with the submerged buoy 36. The submerged buoy coupling system 160 as described is particularly desirable because it allows operations to be conducted in any weather since the coupling is generally under water. In addition, in one or more embodiments, the submerged buoy coupling system 160 may also be utilized to fluidically couple liquified carbon dioxide storage tanks 144 with a submerged buoy 36 to allow liquid carbon dioxide to be pumped using the cryogenic liquid cargo pumps 173 to a storage facility, industrial consumer, etc. In addition, or alternatively, in one or more embodiments, the submerged buoy coupling system 160 may also be utilized to fluidically couple the gaseous carbon dioxide loading manifold 142 with a submerged buoy 36 to allow gaseous carbon dioxide to be onboarded for processing by carbon dioxide liquefaction system 148, or to allow liquid carbon dioxide to be onboarded. In one or more other embodiments, the carbon dioxide transport and sequestration marine vessel 100 may include an above-water coupling system located above all drafts and adjacent to the upper deck 138 to offload supercritical carbon dioxide for injection, or liquid carbon dioxide for storage etc. The above-water coupling system is provided to fluidically couple the export manifold 28 with an above-water/underwater conveyance system 30 extending from the carbon dioxide transport and sequestration marine vessel 100 to a carbon dioxide injection wellhead 40. In this regard, above-water/underwater conveyance system 30 may include connector and underwater risers 34 (see FIG. 1) to allow supercritical carbon dioxide to be pumped to wellhead 40 for injection. The above-water coupling system may include a suitable system on or above the upper deck at a desirable location along elongated hull 114 to permit retrieval and engagement with the connector of the above-water/underwater conveyance system 30. The above water coupling system as described is particularly desirable because it does not require a moonpool but still allows operations to be conducted in any weather since the coupling is generally under water when not connected. In addition, in one or more embodiments, the above-water coupling system may also be utilized to fluidically couple liquified carbon dioxide storage tanks 144 with above-water/underwater conveyance system 30 to allow liquid carbon dioxide to be pumped using the cryogenic liquid cargo pumps 173 to a storage facility, industrial consumer, etc. In addition, or alternatively, in one or more embodiments, the above-water coupling system may also be utilized to fluidically couple the gaseous carbon dioxide loading manifold 142 with an above-water/underwater conveyance system 30 to allow gaseous carbon dioxide to be onboarded for processing by carbon dioxide liquefaction system 148, or also liquid carbon dioxide to be onboarded. It will be appreciated that the disclosure is not limited to a particular carbon dioxide offloading system and that the loading manifold 142, or another manifold(s), could also be used to offload liquid, or supercritical, carbon dioxide.

Figure 5:
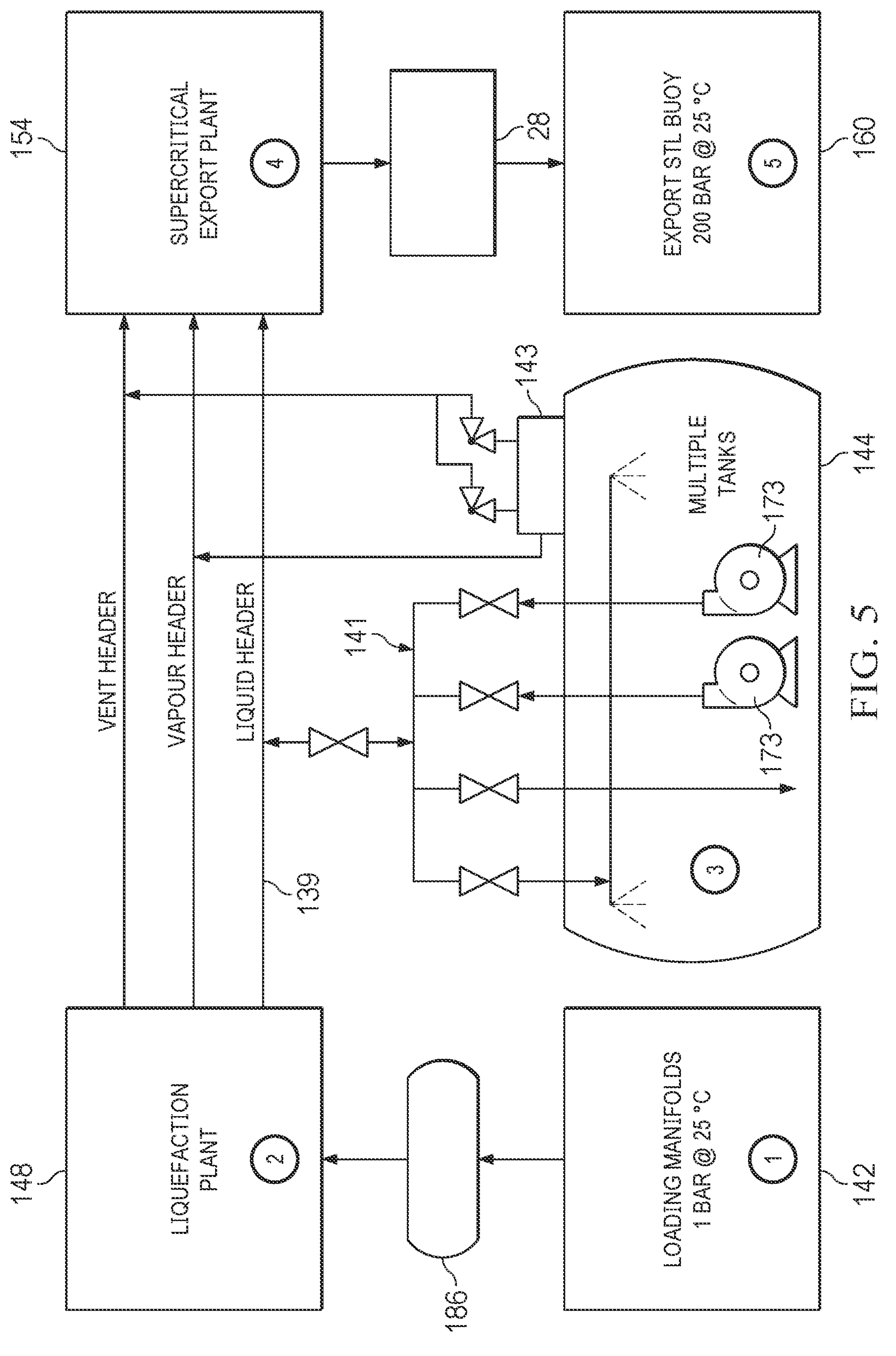
FIG. 5 is a schematic of the primary carbon dioxide cargo systems onboard the marine liquefaction transportation and injection vessel of FIG. 2.

FIG. 5 is a schematic of the primary carbon dioxide cargo systems onboard carbon dioxide transport and sequestration marine vessel 100 and illustrates process flow therebetween. As shown in FIG. 5, loading manifold 142 receives gaseous carbon dioxide which may generally be delivered to carbon dioxide transport and sequestration marine vessel 100 at standard temperature and pressure (1 bar at 25 degrees Celsius). In some embodiments, individual deliveries of gaseous carbon dioxide may be onboarded at different pressures or at different volumes. In such case, the gaseous carbon dioxide may be temporarily collected in one or more onboard gaseous carbon dioxide temporary storage tanks 186 to permit pressures to equalize or to allow for a collection of a minimum volume of carbon dioxide before liquefaction. Notwithstanding the foregoing, the gaseous carbon dioxide flows from loading manifold 142 to carbon dioxide liquefaction system 148, where the gaseous carbon dioxide is liquified. In one or more embodiments, this is a continuous process, where gaseous carbon dioxide flows directly to the carbon dioxide liquefaction system 148 and is liquified as the gaseous carbon dioxide is onloaded to carbon dioxide transport and sequestration marine vessel 100. In some embodiments, collection of gaseous carbon dioxide by temporary storage tanks 186 to a predetermined volume permits the continuous process to occur while still loading where the loading gas flow would not otherwise support a continuous process. Where the carbon dioxide being onboarded is of a sufficient volume, in one or more embodiments, gaseous carbon dioxide that is pumped onboard is not temporarily stored onboard, but immediately liquified. In one or more embodiments, carbon dioxide liquefaction system 148 liquefies the gaseous carbon dioxide to a temperature and pressure of between −55 degrees Celsius and −28 degrees Celsius and between 5 bar and −15 bar, respectively.

Following liquefaction, the liquid carbon dioxide is transferred via pipework 139 to a distribution manifold 141 that directs the liquid carbon dioxide to one or more downstream liquified carbon dioxide storage tanks 144 where the liquified carbon dioxide is stored during transport to an injection location 14 (see FIG. 1). Liquified carbon dioxide storage tanks 144 include one or more cryogenic liquid cargo pumps 173 disposed therein for pumping liquified carbon dioxide to carbon dioxide supercritical system 154, which may be through distribution manifold 141 and pipework 139. Liquified carbon dioxide storage tanks 144 may include a boil-off gas manifold 143 for removing boil-off gas from liquified carbon dioxide storage tanks 144 and introducing the boil-off gas to a carbon dioxide supercritical system 154. Liquified carbon dioxide storage tanks 144 preferably maintain the liquified carbon dioxide at approximately 20 bar and −28 degrees Celsius.

Carbon dioxide supercritical system 154 is disposed downstream of the liquified carbon dioxide storage tanks 144 to receive liquified carbon dioxide at approximately 20 bar and −28 degrees Celsius and transform the liquified carbon dioxide into a supercritical fluid by holding the liquid carbon dioxide above the critical point for carbon dioxide, namely approximately 31.0 degrees Celsius. and 73.8 bar. In this regard, it should be noted that the carbon dioxide is stored as refrigerated liquid and not as a supercritical liquid; it is only transformed to supercritical liquid downstream of liquified carbon dioxide storage tanks 144. Typically, the conversion of liquified carbon dioxide to supercritical carbon dioxide will not be initiated until carbon dioxide transport and sequestration marine vessel 100 has reached the second location 14 and is ready to inject the supercritical carbon dioxide into a storage facility 16 (see FIG. 1) since the supercritical carbon dioxide is preferably pumped directly from the carbon dioxide transport and sequestration marine vessel 100 into the storage facility 16 (such as a subsea reservoir 46) without any intermediate storage. Of course, in other embodiments, the supercritical carbon dioxide may be pumped to an intermediate storage facility (not shown). It will be appreciated that in addition to pressurizing liquid carbon dioxide for the purposes of supercritical transformation, the fluid is also raised to a pressure that is desirable for injection of the fluid into a sequestration reservoir. In one or more embodiments, this may be approximately 200 bar at 31 degrees Celsius. Thus, carbon dioxide supercritical system 154 also prepares the carbon dioxide for export.

In any event, in one or more embodiments, the supercritical carbon dioxide from the carbon dioxide supercritical system 154 is offloaded from carbon dioxide transport and sequestration marine vessel 100 via export manifold 28. While export manifold 28 may be utilized to deliver supercritical carbon dioxide to any storage facility 16, in one or more embodiments, export manifold 28 may be in fluid communication with submerged buoy coupling system 160 disposed to engage a submerged buoy 36 of underwater conveyance system 30 (see FIG. 1).

It will be appreciated that the disclosure is not limited to a particular carbon dioxide liquefaction system 148. In this regard, the carbon dioxide liquefaction system 148 may be low pressure liquid carbon dioxide system or a high-pressure liquid carbon dioxide system. However, for purposes of the carbon dioxide transport and sequestration marine vessel 100, it is more desirable to utilize a medium pressure system to ensure the safe carriage of carbon dioxide at a temperature and pressure that minimizes operational risk of solidification of the carbon dioxide by staying suitably above the triple point of carbon dioxide. In this regard, liquefaction is achieved through both compression and cooling of the gaseous carbon dioxide.

Figure 6:
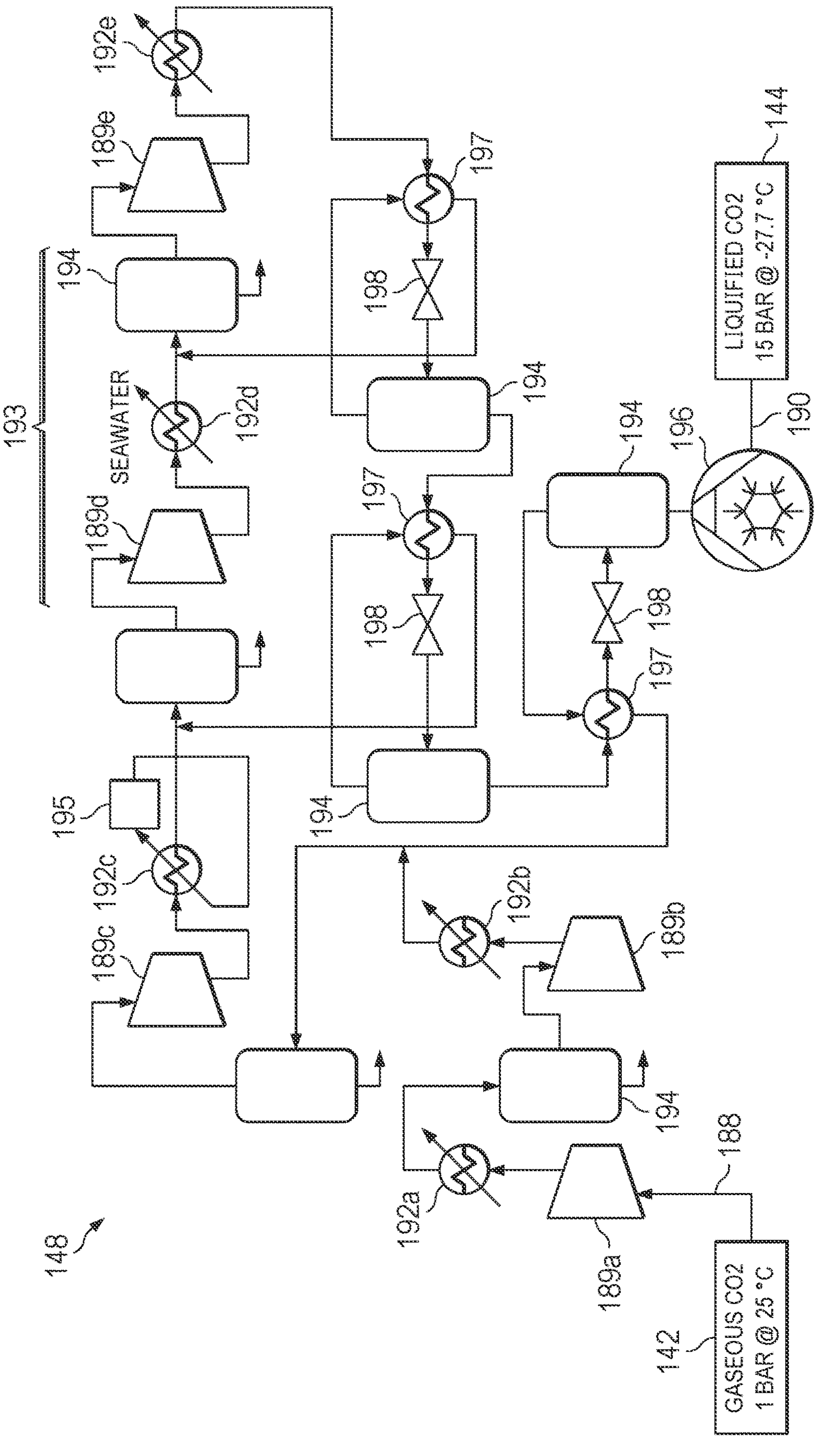
FIG. 6 is a schematic of one embodiment of a carbon dioxide liquefaction system utilized onboard marine liquefaction transportation and injection vessel of FIGS. 2, 3 and 4.

Shown in FIG. 6 is one embodiment of such a carbon dioxide liquefaction system 148, which includes at least one compressor 189 and at least one heat exchanger 192. A gaseous carbon dioxide inlet 188 fluidically coupled to the gaseous carbon dioxide loading manifold 142 provides gaseous carbon dioxide to a compressor 189. Compressor 189 increases the pressure of the gaseous carbon dioxide while heat exchanger 192 removes heat from the compressed fluid. The compressed fluid is directed to a separator 194 to separate liquified carbon dioxide from gaseous carbon dioxide. Together, a compressor 189 and a heat exchanger 192 form a stage 193 of carbon dioxide liquefaction system 148. The gaseous carbon dioxide still remaining following a stage of compression and cooling may then be passed to another stage where the process is repeated. In one or more embodiments, multiple stages 193 may be arranged in series, such as shown in FIG. 6. Although not limited to a particular number of stages 193, in the illustrated embodiment, five stages of compression are illustrated, namely a first stage 193*a* with a compressor 189*a* and a heat exchanger 192*a*; a second stage 193*b* with a compressor 189*b* and a heat exchanger 192*b*; a third stage 193*c* with a compressor 189*c* and a heat exchanger 192*c*; a fourth stage 193*d* with a compressor 189*d* and a heat exchanger 192*d*; and a fifth stage 193*e* with a compressor 189*e* and a heat exchanger 192*e*. Each stage 193 may also include one or more gas-liquid separators 194. Other embodiments of carbon dioxide liquefaction system 148 may have at least three stages 193.

In one or more embodiments, sea water may be used as the cooling fluid passed through the one or more heat exchangers 192 to cool the compressed carbon dioxide passing therethrough. In other embodiments, the cooling fluid utilized in the heat exchangers may be a refrigerant from a closed loop refrigeration system 195 as is known in the art as generally including one or more evaporators, a refrigerant compressor, an expansion valve and an air-cooled condenser. In other embodiments, the heat exchangers 192 may be air-cooled.

In one or more embodiments, downstream of the one or more stages 193, carbon dioxide liquefaction system 148 may include one or more flash gas cooled heat exchangers 197 followed by a Joule-Thomson (JT) valve or expander 198 in order to further cool any gaseous carbon dioxide remaining following the one or more stages 193 of compression described above. In such case, remaining gaseous carbon dioxide is passed through a flash gas cooled heat exchangers 197 that utilizes gaseous carbon dioxide from a downstream gas-liquid separator 194 as the cooling medium for the upstream flash gas cooled heat exchangers 197. Although not limited to a particular number of stages, in the illustrated embodiment, three stages of flash gas cooled heat exchangers 197 are illustrated, where gaseous carbon dioxide used as the cooling medium for the flash gas cooled heat exchangers 197 is reintroduced carbon dioxide liquefaction system 148 back upstream of the flash gas cooled heat exchangers 197 for further cooling.

Carbon dioxide liquefaction system 148 may also include a cryogenic pump 196 to pump liquified carbon dioxide via outlet 190 from carbon dioxide liquefaction system 148 to liquified carbon dioxide storage tanks 144.

Figure 7:
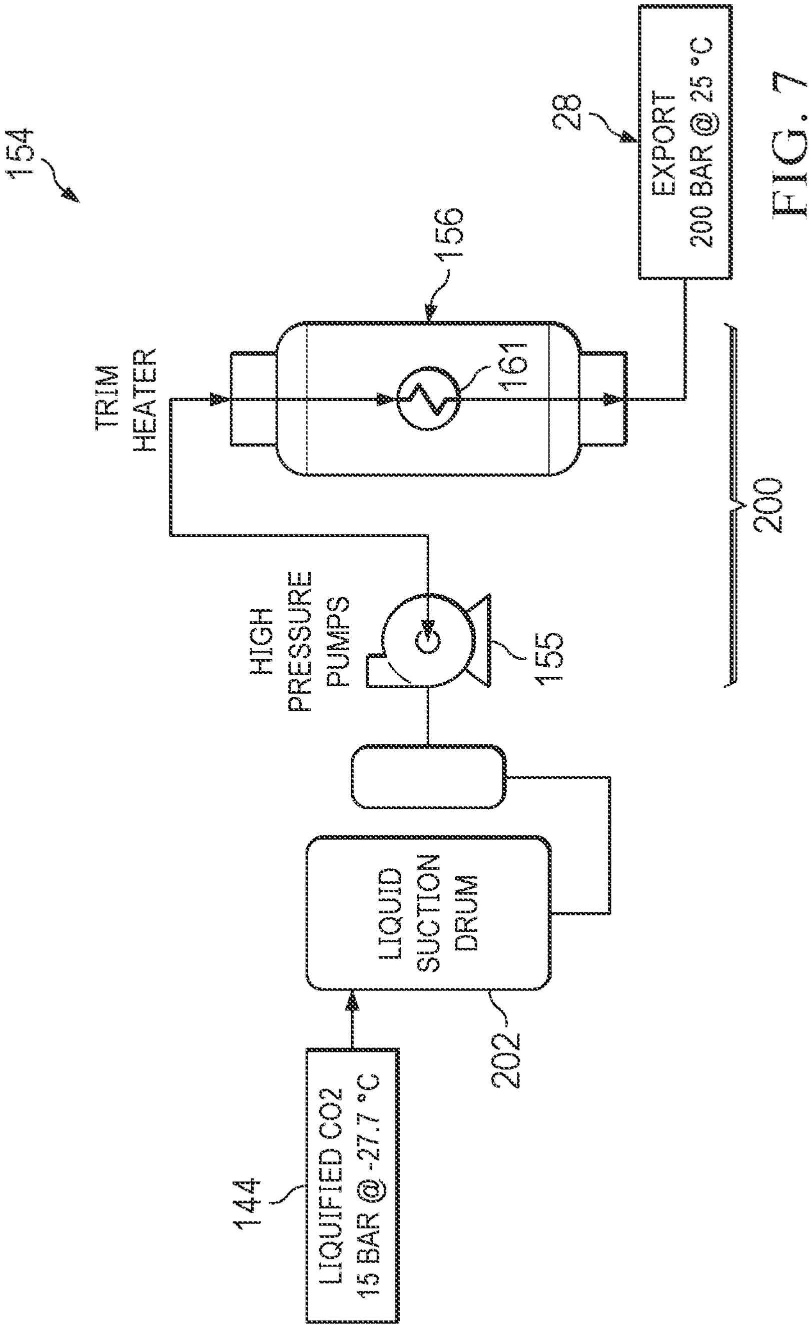
FIG. 7 is a schematic of one embodiment of a carbon dioxide supercritical system utilized onboard marine liquefaction transportation and injection vessel of FIGS. 2, 3 and 4.

It will be appreciated that the disclosure is not limited to a particular carbon dioxide supercritical system 154. Shown in FIG. 7 is one embodiment of a carbon dioxide supercritical system 154. Liquified carbon dioxide from liquified carbon dioxide storage tanks 144 is directed to the carbon dioxide supercritical system 154. In one or more embodiments, the liquified carbon dioxide is introduced into the carbon dioxide supercritical system 154 at approximately 15 bar and −27 degrees Celsius, after which, the pressure is first increased to above the critical point for carbon dioxide, and thereafter the temperature is increased above the critical point for carbon dioxide. Thus, in one embodiment, the liquified carbon dioxide from liquified carbon dioxide storage tanks 144 is directed to one or more high-pressure pumps 155 of the carbon dioxide supercritical system 154 to increase the pressure above the critical pressure point. High-pressure pumps 155 may be cryogenic pumps. In some embodiments, the pressure may be increased to approximately 200 bar. In some embodiments, the pressure may be increased to approximately five times the storage pressure within liquified carbon dioxide storage tanks 144. As used herein, a ‘high-pressure pump’ described with respect to the carbon dioxide supercritical system 154 refers to a pump that is capable of increasing the pressure of the liquified carbon dioxide from the storage pressure to at least 200 bar.

In any event, following pressurization by high-pressure pump(s) 155, the pressurized liquid carbon dioxide is passed to a heater 156 to increase the temperature of the pressurized liquid carbon dioxide to a temperature above the critical temperature point. In some embodiments, the temperature may be increased to at least 31 degrees Celsius, which is the supercritical temperature for carbon dioxide. In one or more embodiments, heater 156 may utilize a heat source 161 to heat the pressurized liquid carbon dioxide. In some embodiments, heater 156 is a trim heater and heat source 161 may be an electric heat source. In some embodiments, heat source 161 may be a heat exchanger utilizing exhaust gas from 157 (see FIG. 9) engines of carbon dioxide transport and sequestration marine vessel 100 or other processes on the carbon dioxide transport and sequestration marine vessel 100 to heat the pressurized liquid carbon dioxide. In some embodiments, carbon dioxide supercritical system 154 may include two or more high-pressure pumps 155 in series, two or more heaters 156 in series or a serial arrangement of supercritical stages 200 consisting of a high-pressure pump 155 and a heater 156. Alternatively, two or more supercritical stages 200 may be arranged in parallel to increase the amount of liquified carbon dioxide being processed from liquified carbon dioxide storage tanks 144 for injection, where the parallel streams may be comingled at export manifold 28 for unloading. In such arrangements, the parallel stages 200 may be fed from a single suction drum 202.

It will be appreciated that the high-pressure pumps 155 are utilized not only to raise the pressure of the liquified carbon dioxide, but also to drive the liquefied carbon dioxide through the heater 156 and the export manifold 28. In particular, the pressure applied to the liquefied carbon dioxide is sufficiently high to pump the liquefied carbon dioxide from carbon dioxide transport and sequestration marine vessel 100, through the export system and any intermediate piping system into the reservoir for sequestration. Thus, in some embodiments, there is no need to boost pressure prior to injection, thus allowing carbon dioxide transport and sequestration marine vessel 100 to directly inject the supercritical carbon dioxide into a storage facility 16, such as a subsea reservoir 46, via the export manifold 28.

In one or more embodiments, the supercritical carbon dioxide is pumped to one or more injection wellheads 40 that are in fluid communication with one or more wellbores 42 extending from the seabed 44 to subsea reservoir 46 for storage. In other embodiments, the supercritical carbon dioxide may be routed to platform 38 having flow lines 39 to transfer the supercritical carbon dioxide to the injection wellbores 42 of an underground reservoir 46. It will be appreciated that one desirable feature of the described system is that existing hydrocarbon production systems, such as platform 38, flow lines 39 and wellheads 40, may be repurposed for use in injection of the supercritical carbon dioxide. In some embodiments, repurposed, existing platforms 38 may be configured with a dry tree system, where the wellheads 40 are situated on platform 38, and each wellhead 40 may have its own separate riser extending to a wellbore 42. This enables easy access to existing, low-cost systems with a direct vertical flow path without the need to install new injection equipment or platforms. This will minimize flow assurance challenges and enable straightforward well interventions and workovers.

By having a carbon dioxide supercritical system 154 onboard, the carbon dioxide transport and sequestration marine vessel 100 can pressurize and supply the carbon dioxide at any marine storage facility at the required conditions, as opposed to a storage facility being designed to locally pressurize etc. the carbon dioxide to the conditions required for storage. Moreover, the properties of supercritical carbon dioxide is that it has a high density and low pour point, which enhances its injection into a rock formation such as an underground reservoir 46 for sequestration.

Figure 8:
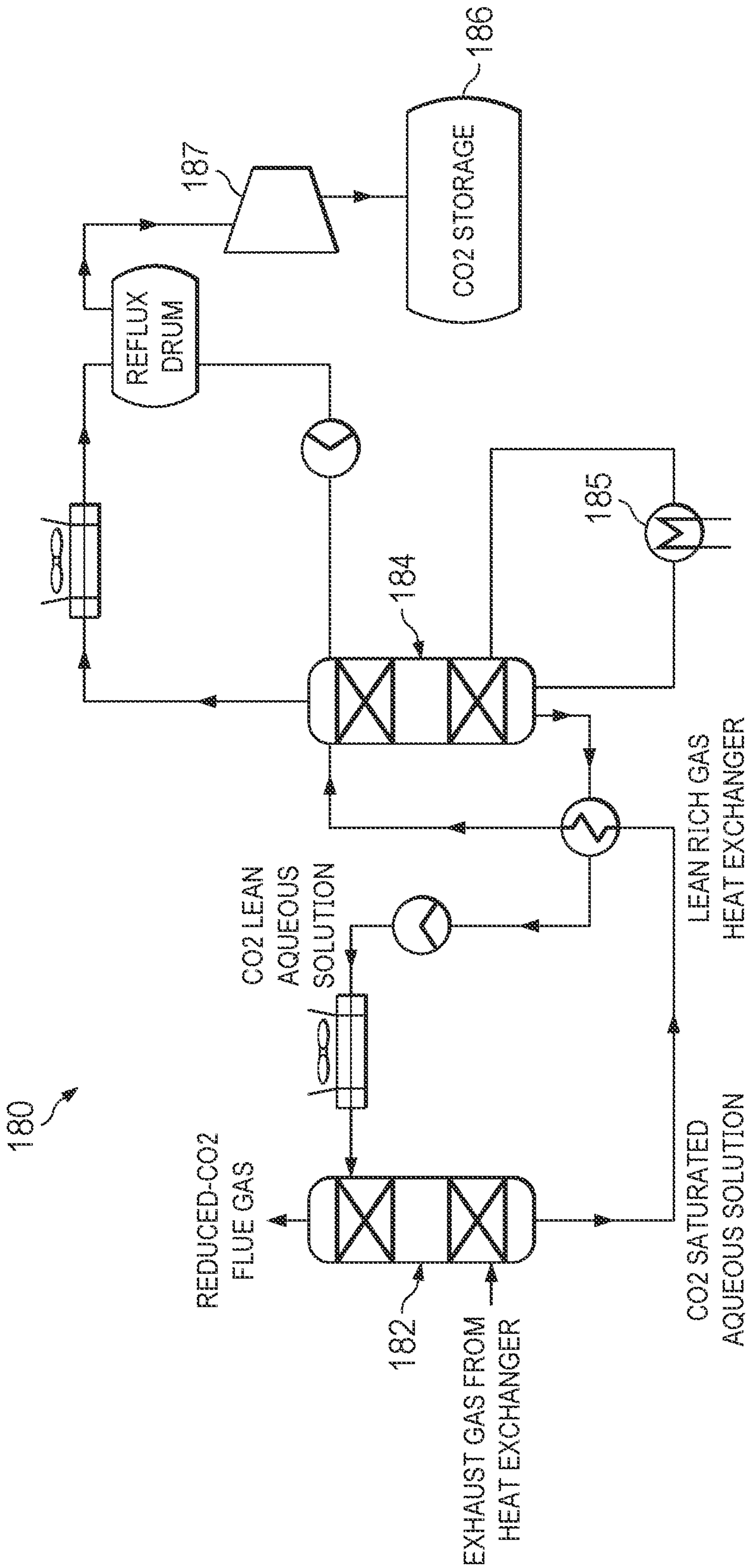
FIG. 8 is a schematic of one embodiment of a carbon dioxide capture system utilized onboard marine liquefaction transportation and injection vessel of FIGS. 2, 3 and 4.
Figure 9:
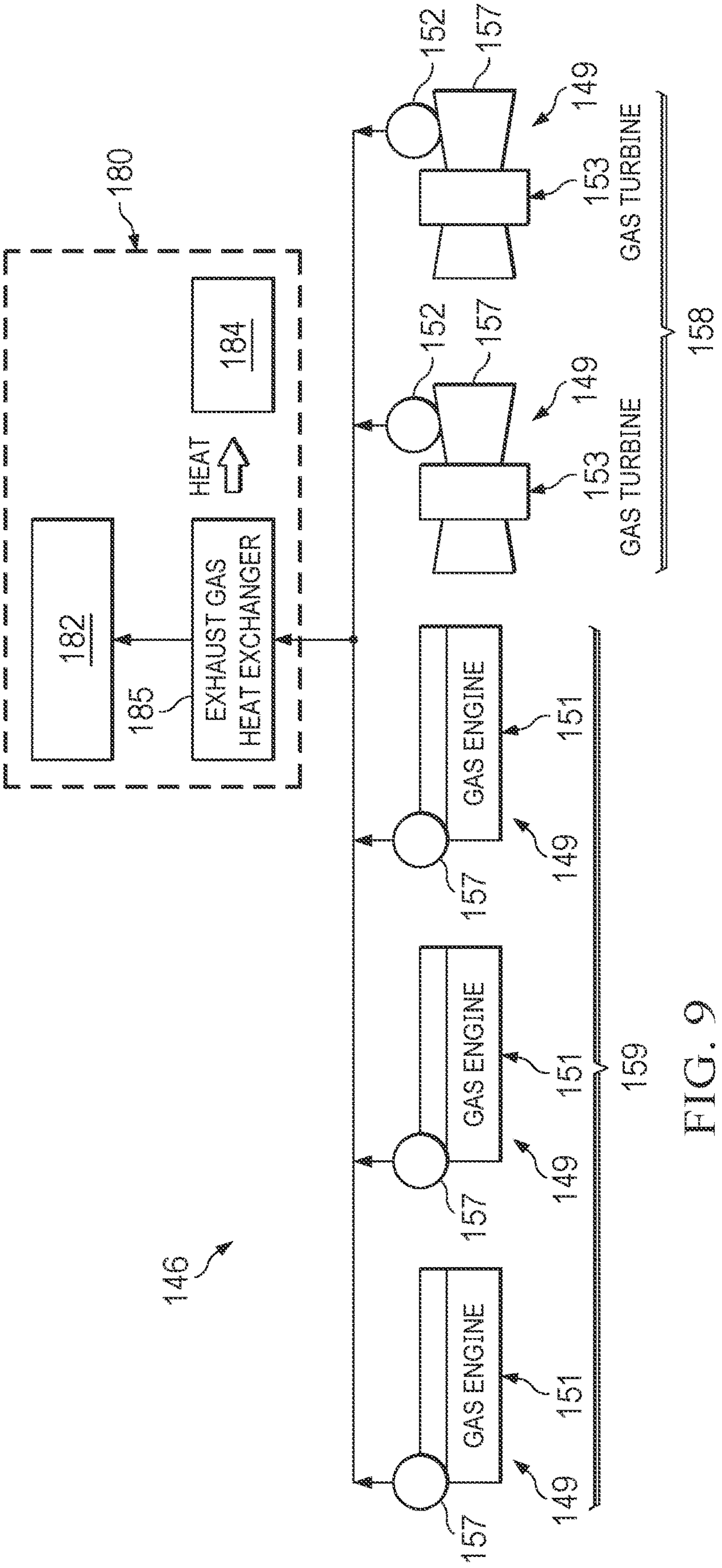
FIG. 9 is a schematic of one embodiment of a heat recovery system used in conjunction with the carbon dioxide capture system of FIG. 8.

With reference to FIGS. 8 and 9, in one or more embodiments, the carbon dioxide transport and sequestration marine vessel 100 may also include a carbon dioxide capture system 180 to remove carbon dioxide from the exhaust flue gas of engines 149 utilized on board the carbon dioxide transport and sequestration marine vessel 100. Such engines 149 may include piston engines 151, such as gas engines, diesel/dual fuel/tri fuel/etc. piston engines, and the like, as well as gas turbines 153. In any event, one or more of the engines 149 include a flue gas exhaust 157, 152. It will be appreciated that because carbon dioxide transport and sequestration marine vessel 100 is self-propelled in some embodiments, one or more of the engines 149 may form part of a propulsion system 146 for carbon dioxide transport and sequestration marine vessel 100, as shown in FIG. 8. Additionally, one or more of the engines 149 may be utilized to generate electric power and/or heat for use by the carbon dioxide liquefaction system 148 and/or the carbon dioxide supercritical system 154, as well as other systems on carbon dioxide transport and sequestration marine vessel 100 such as charging of batteries. Alternatively, whist alongside in a port, or moored nearshore or offshore, the carbon dioxide transport and sequestration marine vessel 100 may take electric power from shore or other source(s) for use by the carbon dioxide liquefaction system 148 and/or the carbon dioxide supercritical system 154. In any event, the carbon dioxide signature of carbon dioxide transport and sequestration marine vessel 100 arising from these engines 149 may be minimized or eliminated by utilizing carbon dioxide capture system 180 to remove carbon dioxide from the flue gas exiting the flue gas exhausts 157 and/or 152. In one or more embodiments, the carbon dioxide capture system 180 includes an absorber 182 with an aqueous solution disposed to absorb gaseous carbon dioxide from the flue gas emitted from the flue gas exhausts 152, 157, resulting in a carbon dioxide saturated aqueous solution. In one or more embodiments, absorber 182 may be a vertical tower or vessel as is known in the art.

Carbon dioxide capture system 180 may also include a desorber 184, where heat can be applied to saturated aqueous solution in order to release the carbon dioxide gas from the saturated aqueous solution. In one or more embodiments, desorber 184 may be a vertical tower or vessel as is known in the art. In one or more embodiments, the aqueous solution may be amine, while in other embodiments, the aqueous solution may be another absorbent of carbon dioxide.

In any event, it will be appreciated that the heat required by desorber 184 in order to release carbon dioxide from the saturated aqueous solution may be more than the exhaust heat resulting from typical piston engines utilized to propel marine vessels. Rather, heat from a heat source such as piston engines on board a marine vessel is typically released as part of the exhaust flue gas from the exhaust of the piston engines, it being appreciated that in most prior art marine vessels it is desirable to minimize heat generation since heat must be managed in a way similar to other by-products of combustion. To address the significant heat requirements of desorber 184, carbon dioxide transport and sequestration marine vessel 100 includes one or more additional heat sources. In one or more embodiments, carbon dioxide transport and sequestration marine vessel 100 includes a combination of piston engines 151 and gas turbines 153 as a primary source of power to propel carbon dioxide transport and sequestration marine vessel 100, the flue gasses of which will also serve as a primary source of heat for use by desorber 184.

Thus, in one or more embodiments, a portion of the engines 149, such as the gas turbines 153, may function as a primary heat source 158 for providing heat to carbon dioxide capture system 180, and another portion of the engines 149, such as piston engines 149, may function as a secondary heat source 159 for providing heat to carbon dioxide capture system 180. In other embodiments, a single heat source, such as gas turbines 153 may be used as long as the waste heat is sufficiently high to support the carbon dioxide capture system 180. In the FIGS. 8 and 9, desorber 184 is in thermal communication with the flue gas exhaust 152 of at least gas turbines 153 via heat exchanger 185 which is used to transfer heat from the flue gas to desorber 184. Heat exchanger 185 may be any type of heat exchanger known in the art. In one or more embodiments, heat exchanger 185 is in fluid communication with both the flue gas exhausts 152 of both the gas turbines 153 as a primary heat source 158 and the piston engines 151 as a secondary heat source 159. In any event, the flue gas from the engines 149 may then be passed to the absorber 182 for carbon dioxide scrubbing.

Primary heat source 158 may be comprised of gas turbines 153 because of the significant heat that can be generated by gas turbines compared to piston engines 151. Additionally, secondary heat source 159 may be comprised of piston engines 151 forming propulsion system 146. In any event, heat from primary heat source 158 may be used, either alone or combined with heat from secondary heat source 159, in the desorber 184 to separate the gaseous carbon dioxide from the saturated aqueous solution, it being understood by persons of skill in the art that such separation requires more heat than would typically be available from the piston engines typically utilized to propel marine vessels. It will be appreciated that generally, for propulsion purposes, piston engines are more desirable than higher heat producing engines from a heat management perspective because the piston engines produce less heat and are thus more efficient from a heat management perspective, minimizing the production of waste heat. However, in one or more embodiments, it is desirable to use a less heat-efficient engine, such as a gas turbine, for propulsion, in order to take advantage of the higher heat output for use by carbon dioxide capture system 180.

Finally, while gas turbines 153 are proposed herein as a source of heat, in other embodiments, gas turbines 153 may be eliminated and primary heat source 158 may be electric heaters or another heat source.

While carbon dioxide capture system 180 has been described in relation to a carbon dioxide transport and sequestration marine vessel 100 having a carbon dioxide liquefaction system 148 and a carbon dioxide supercritical system 154, it will be appreciated that carbon dioxide transport and sequestration marine vessel 100 need not include these components in some embodiments. In this regard, carbon dioxide capture system 180 may be utilized with any marine vessel to minimize carbon dioxide signature by utilizing gas turbines 153 on board the marine vessel to produce heat for carbon dioxide capture system 180. While gas turbines 153 might not typically be feasible alone as a source for power in a marine vessel propulsion system 146, where any marine vessel includes a carbon dioxide capture system 180, then such gas turbines 153 may be desirable. However, carbon dioxide capture system 180 is particularly useful on a carbon dioxide transport and sequestration marine vessel 100 where at least a carbon dioxide liquefaction system 148 is carried by the carbon dioxide transport and sequestration marine vessel 100 so that carbon dioxide transport and sequestration marine vessel 100 can liquefy the carbon dioxide removed from the flue gas generated by the carbon dioxide transport and sequestration marine vessel's propulsion system.

In one or more embodiments, gas turbines 153 (and/or other engines with similar exhaust gas characteristics) are utilized as primary heat source 158 to generate sufficient heat that either alone or when combined with heat from secondary heat source 159, such as the piston engines 151, will provide sufficient heat in the desorber 184 to release carbon dioxide gas from the saturated aqueous solution passing therethrough.

Carbon dioxide gas from desorber 184 may then be compressed by a compressor 187 and stored on carbon dioxide transport and sequestration marine vessel 100 in one or more compressed carbon dioxide storage tanks 186. To the extent stored as gaseous carbon dioxide in compressed carbon dioxide storage tanks 186, the gaseous carbon dioxide may then be liquified once the carbon dioxide transport and sequestration marine vessel 100 is again operating its liquefaction system 148. For example, the gaseous carbon dioxide captured from the carbon dioxide transport and sequestration marine vessel's exhaust flue gas may be liquified at a loading location 10 (see FIG. 1) as gaseous carbon dioxide external to carbon dioxide transport and sequestration marine vessel 100 is loaded as described above.

Figure 10A:
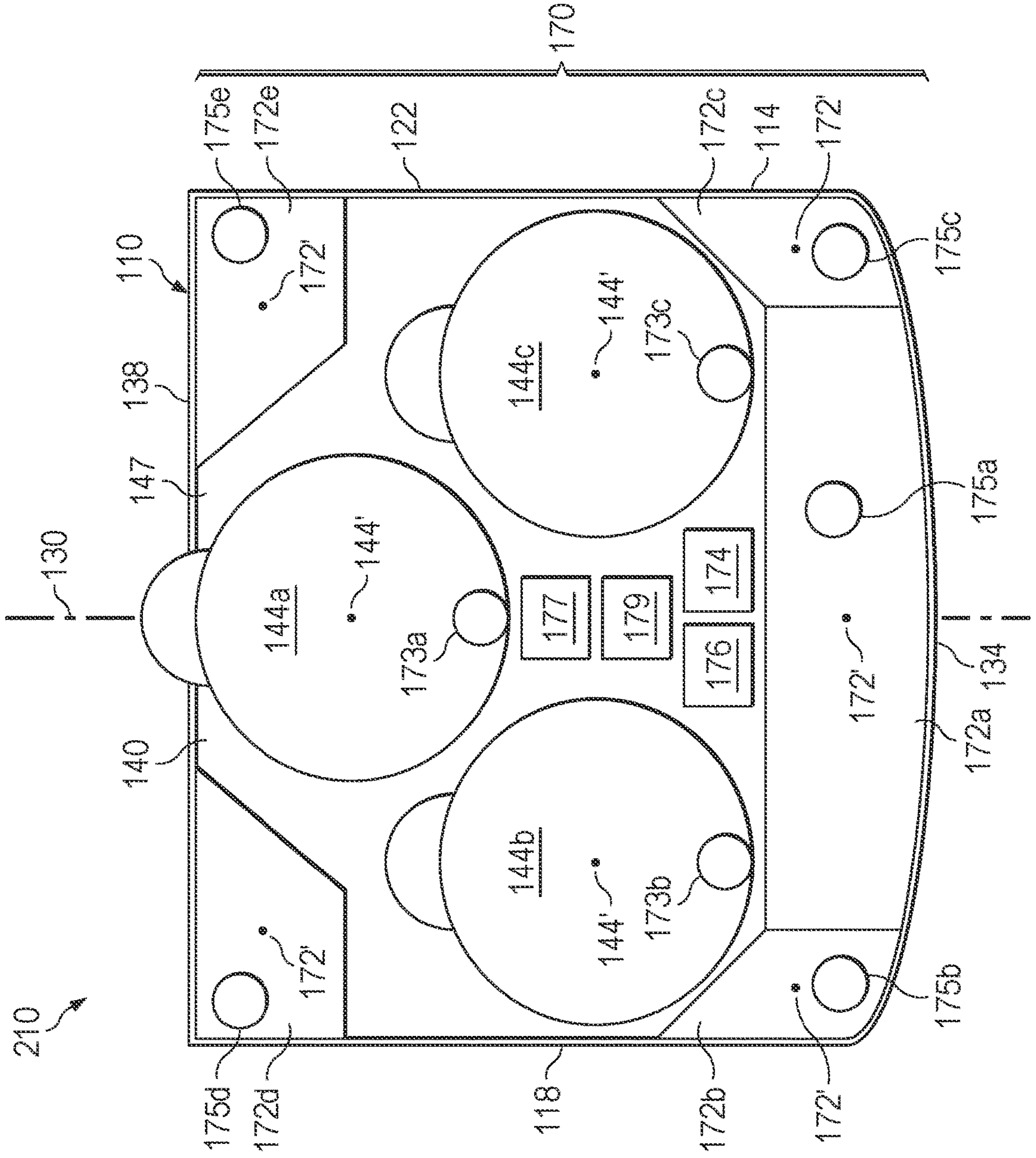
FIG. 10*a* is a cutaway cross-sectional view through a marine vessel illustrating one embodiment of a water ballast system.
Figure 10B:
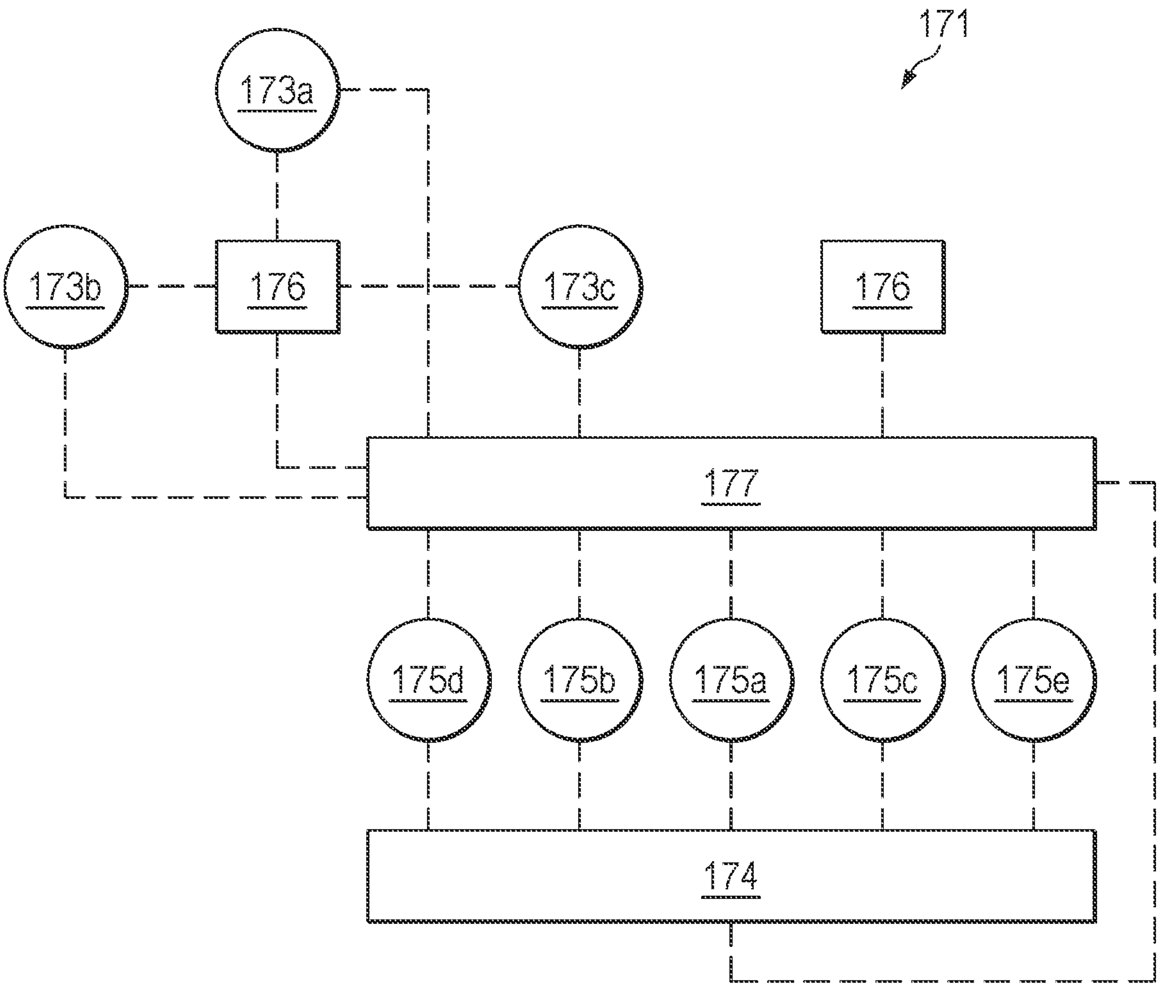
FIG. 10*b* is a schematic of a water ballast management/control system of a marine vessel.

Turning to FIGS. 10*a* and 10*b*, a water ballast system 170 for a marine vessel 210 is illustrated. In one or more embodiments, water ballast system 170 may be used in conjunction with a carbon dioxide transport and sequestration marine vessel 100 having carbon dioxide liquefaction system 148, liquified carbon dioxide storage tanks 144, and carbon dioxide supercritical system 154. In other embodiments, water ballast system 170 may be used with other types of marine vessels, although water ballast system 170 is particularly suited for liquid cargo marine vessels. Moreover, in one or more embodiments, the liquid cargo may be cryogenic cargo, such as liquid nitrogen, helium, hydrogen, argon, ammonia, methane, carbon monoxide, carbon dioxide or other hydrocarbons. Thus, for ease of description, water ballast system 170 will be described in terms of liquified carbon dioxide storage tanks 144 and carbon dioxide transport and sequestration marine vessel 100, but it will be understood that water ballast system 170 may be used with other liquid storage tank types or configurations, or even dry cargo in marine vessels 210 of other types.

In any event, the water ballast system 170 as described herein may be utilized to achieve or maintain a particular condition of marine vessel 210 during loading of liquid cargo or unloading of liquid cargo, where the particular condition may be one of waterline, deadweight distribution, or hull girder loading. In one or more embodiments, the water ballast system 170 may be utilized to maintain a constant condition of the marine vessel 210. For example, the waterline of marine vessel 210 may be maintained as constant throughout loading or unloading of a liquid cargo by utilizing the water ballast system 170. In any event, achieving such a condition, such as maintaining a constant waterline during loading, transporting and unloading of the liquid cargo, permits the marine vessel 210 to be detuned, at least to some degree, from effects of external forces on the marine vessel 210, such as wind, waves, etc.

Thus, water ballast system 170 can be used to achieve a desired waterline (draft, trim, heel, and therefore hydrostatics) and/or constant deadweight distribution (of mass namely extents and centers of gravity, and therefore mass inertias), further enhancing loading and unloading of cargo through reduced motions due to detuning, and hence increasing uptime. In this same vein, water ballast system 170 as described herein maintains a constant stillwater bending moment or hull girder loading as the marine vessel 210 is loaded and unloaded, particularly with respect to liquid cargo. It will be appreciated that in the prior art, a ship's hull girder may change from a sagging position when loaded to a hogging position when unloaded, which change creates significant stress on the ship's hull. Water ballast system 170 seeks to maintain the same hull girder loading throughout loading and unloading of cargo with respect to marine vessel 210. Moreover, it will be appreciated that the stillwater bending moment or hull girder loading results from the specific location or position of cargo on marine vessel 210. For this reason, a plurality of ballast tanks are positioned throughout the hull's cargo storage areas at various locations so that the still water bending moment of marine vessel 210 when fully loaded with cargo can be mimicked as the marine vessel 210 is unloaded (in contrast to prior art ballast arrangements which are not designed to mimic a ship's still water bending moment). Therefore, water ballast system 170, may be particularly desirable for carbon dioxide transport and sequestration marine vessel 100 as described herein, where onboard liquification of carbon dioxide and offloading supercritical carbon dioxide could otherwise result in significant changes in the stillwater bending moment of marine vessel 100.

In some embodiments, the water ballast system 170 may be active in the sense that it is automatic or self-managing by monitoring liquid cargo tank conditions (such as the level or volume of liquid cargo within a tank or flow rate of liquid cargo to or from a liquid cargo storage tank), wave conditions and the like and activating appropriate pumps to maintain a desired waterline and deadweight distribution configuration for the carbon dioxide transport and sequestration marine vessel 100 or marine vessel 210.

Water ballast system 170 includes a plurality of water ballast tanks 172 disposed about one or more cargo areas or holds 147. In one or more embodiments, each cargo hold 147 includes a plurality of water ballast tanks 172. Within a cargo hold 147, at least two water ballast tanks 172 are provided, spaced apart about a centerline plane 130. In the illustrated embodiment, a plurality of water ballast tanks are distributed symmetrically about centerline plane 130, namely a first water ballast tank 172*a*, a second water ballast tank 172*b*, a third water ballast tank 172*c*, a fourth water ballast tank 172*d*, and a fifth water ballast tank 172*e*. In the illustrated embodiment, the ballast tanks 172 are disposed throughout the cargo hold 147 at different locations to permit the stillwater bending moment of marine vessel 100 to be mimicked. Thus, first water ballast tank 172*a* is disposed along the bottom of the hull 114 adjacent keel 134. One or more water ballast tanks such as water ballast tank 172*a* disposed along the bottom of hull 114 or the lowermost portion of a cargo hold 147 may be generally considered bottom water ballast tanks. Second and third water ballast tanks 172*b*, 172*c*, are disposed adjacent to first hull side 118 and second hull side 122, respectively and may extend up along the respective hull sides 118, 122, adjacent to or at least partially above the lowermost cargo (such as fluid cargo tanks 144*b* and 144*c*). Such water ballast tanks may be generally considered as side water ballast tanks. Such side water ballast tanks may be spaced apart from the bottom water ballast tanks. Moreover, such side tanks may be positioned throughout the cargo hold 147 and are not limited to placement adjacent the sides in some embodiments. For example, in FIG. 10*a*, such side water ballast tanks may be positioned between liquid cargo tank 144*b* and liquid cargo tank 144*c*. Fourth and fifth ballast tanks 172*d* and 172*e* may be positioned adjacent upper deck 138 or the deck enclosing the cargo hold 147 from above. In such case, fourth and fifth ballast tanks 172*d*, 172*e* may be positioned to be substantially above the cargo within cargo hold 147, such as fluid cargo tanks 144*a*, 144*b* and 144*c*, and may be considered upper water ballast tanks. In some embodiments, fourth and fifth ballast tanks 172*d* and 172*e* may be positioned adjacent first and second hull sides 118, 122. In other words, in some embodiments, a first portion of a plurality of water ballast tanks 144 within a cargo hold 147 are bottom water ballast tanks, a second portion of the plurality of water ballast tanks 144 within a cargo hold 147 are side water ballast tanks, and a third portion of the plurality of water ballast tanks 144 within a cargo hold 147 are upper water ballast tanks. Thus, in some embodiments, the first water ballast tank 172*a* is positioned in the cargo hold 147 below the second and third water ballast tanks 172*b*, 172*c*, respectively, and the fourth and fifth water ballast tanks 172*d*, 172*e*, respectively are positioned in the cargo hold 147 above the second and third water ballast tanks 172*b*, 172*c*, respectively. Rather than simply positioning ballast tanks at the bottom of a marine vessel, the plurality of water ballast tanks 172 are disposed at different locations and heights throughout cargo hold 147 to best permit the ballast tanks 172 to be utilized when cargo hold 147 is depleted of cargo to mimic hull girder loading when cargo hold 147 is full of cargo, whether it be liquid cargo or other types of cargo such as dry cargo or containers (not shown). Theses plurality of water ballast tanks 172 may be disposed symmetrically about centerline plane 130.

As described, the plurality of water ballast tanks 144 may be spaced apart from one another and distributed throughout each cargo hold 147 of a marine vessel 210. Such distributed water ballast tanks 144 better enhance the ability of the water ballast system 170 to better achieve constant or proportional deadweight distribution and/or hull girder loading as described herein.

Likewise, one or more liquid cargo tanks 144 are distributed symmetrically about centerline plane 130, such as first liquid storage tank 144*a*, second liquid storage tank 144*b*, and third liquid storage tank 144*c* illustrated in FIG. 10*a*. In some embodiments, the water ballast tanks 172 are positioned in close proximity to the liquid storage tanks 144. Moreover, as described above, in order to maximize the operability (in terms of waterline, hull girder loading and motion responses, etc.), of marine vessel 210, rendering it more accessible to shallow water ports and operable whilst sailing and moored offshore/nearshore, one or more of the water ballast tanks 172 may be positioned adjacent to or above liquid cargo storage tanks 144. In the illustrated embodiment, water ballast tanks 172*d* and 172*e* are shown at least partially above liquid storage tanks 144*b* and 144*c*, thereby making use of the available free space around the liquid storage tanks 144 within hold 147 and providing more flexibility to mimic hull girder loading. By having a plurality of water ballast tanks 172 positioned within each of the cargo holds 147 with the plurality of water ballast tanks 172 in a cargo hold 147 arranged in spaced apart configuration from one another and/or at different positions around storage tanks 144, the still water bending of marine vessel 210 (and marine vessel 100) can be mimicked during unloading.

Relatedly, in one or more embodiments, as water ballast is loaded to or unloaded from the marine vessel 100, water is selectively pumped to the plurality of water ballast tanks 172 in order to maintain the overall deadweight distribution of marine vessel 100.

In one or more embodiments, the liquid cargo storage tanks 144 disposed within a hold 147 fill at least 40% of the volume 147' of the hold 147 and water ballast tanks 172 disposed within a hold 147 fill at least 40% of the volume 147' of the hold 147. Thus, in one embodiment, there is a 1:1 ratio of the volume of water ballast tanks 172 in hold 147 to the volume of liquid cargo storage tanks 144 in hold 147 where the tanks 144, 172 together fill at least 50% of hold 147 volume and in some embodiments, at least 80% of hold 147 volume 147'. In other words, the collective liquid cargo tanks 144 within a cargo hold 147 can be characterized as having a total liquid cargo volume, and the collective water ballast tanks 172 within a cargo hold 147 can be characterized as having a total water ballast volume. In one or more embodiments, the total water ballast volume of the one or more water ballast tanks 172 within a cargo hold 147 is equal to or greater than the total liquid cargo volume of the liquid storage tanks 144 within the hold, it being appreciated that where the liquid cargo has a density greater than water, the total water ballast volume of the one or more water ballast tanks 172 will need to be more than the total liquid cargo volume of the liquid storage tanks 144 in order to achieve the balancing as described herein.

In one or more embodiments, the liquid cargo storage tanks 144 disposed within a cargo hold 147 fill at least 40% of the volume 147' of the hold 147 and water ballast tanks 172 disposed within a hold 147 fill at least 40% of the volume 147' of the hold 147. In one or more embodiments, the liquid cargo storage tanks 144 disposed within a hold 147 fill at least 35% of the volume 147' of the hold 147 and water ballast tanks 172 disposed within a hold 147 fill at least 40% of the volume 147' of the hold 147. In one or more embodiments, the water ballast tanks 172 extend along the water ballast tank axis 172' at least the length of the liquid cargo storage tanks 144 to enhance balancing by the water ballast tanks 172. More broadly, the total capacity and hence filled weight of all water ballast tanks 172 within a cargo hold 147 is selected to be equal to or greater than the total loaded weight of all cargo with a cargo hold 147. It will be appreciated that this is most readily determined where the cargo is liquid contained within one or more storage tanks 144 with a known maximum fill capacity. As such, a liquid storage tank 144 has a first total capacity and one or more water ballast tanks 172 have a second total capacity that results in a water weight equal to or larger than the first total capacity.

It will be appreciated that water ballast system 170 is provided to facilitate direct, and hence also under or possibly over, compensation for changes in individual deadweight groups during loading and/or offloading of cargo but may also be utilized to directly, and hence also under or possibly under, compensate for other liquid consumables onboard marine vessel 210, such as fuels, oils, non-ballast waters, etc. Thus, with reference to FIG. 2 and ongoing reference to FIG. 10*a*, marine vessel 210 may include a consumables storage bunker 145 within hull 114 having one or more liquid consumables storage tanks 150 disposed therein for storing liquid consumables. In one or more embodiments, water ballast tanks 172 such as described with respect to cargo hold 147 may likewise be deployed in the consumables storage bunker 145 to compensate for consumables as they are used up or replenished, as the case may be, where the liquid consumables storage tanks 150 having a total liquid consumables volume and the water ballast tanks 172 disposed within the consumables storage bunker 145 have a total water ballast volume that is equal to or greater than the total liquid consumables volume.

FIG. 10*b* is a schematic of one embodiment of a control system 171 for the water ballast system 170. As noted above, while the water ballast system 170 is described with respect to transportation of liquified carbon dioxide stored in liquid cargo storage tanks 144, it will be appreciated that water ballast system 170 is not limited to the type of cargo contained within a hold 147, nor is water ballast system 170 limited to a marine vessel having one or both of a carbon dioxide liquefaction system 148 and/or a carbon dioxide supercritical system 154. Likewise, although water ballast system 170 is most suitable for use with liquid cargo contained in liquid cargo storage tanks 144, in other embodiments, water ballast system 170 may be used with marine vessels transporting other types of goods, including but not limited to other fluid goods or dry goods or other cargo. Thus, for purposes of the disclosure, FIG. 10*a* may represent or illustrate any liquid cargo storage tanks 144, unless specifically stated otherwise. In any event, within each cargo hold(s) 147 in the cargo region, dedicated groups of water ballast tanks 172 are provided to function in concert with liquid cargo storage tanks 144. As with the cargo hold(s) 147 where liquid cargo is stored, dedicated water ballast tanks 172 may also be provided to function in concert with specific consumables tanks, such as bunker storage or collection tanks for fuels, oils, waters, etc. arranged in other holds or consumable group zones on marine vessel 210. The capacity, disposition (layout, shape, limits etc.), segregation (subdivision) etc. of the water ballast tanks 172 within each cargo hold 147 and consumable group zone may be selected based on their capacity, content types, disposition and configuration of the liquid cargo storage tanks and consumables tanks within each specific zone in order to maintain substantially constant deadweight, extents and centers of gravity, or the water ballast capacity sized etc. in excess to facilitate over compensation of cargo and/or consumables. The water ballast system 170 architecture, capability and performance may be determined based on utilization and consumption profiles of each cargo type. In addition, control system 171 may also monitor various consumables (fuels, oils, waters, etc.) onboard a marine vessel 210 and take these into account as well when adjusting water within ballast tanks 172.

Shown in FIG. 10*a* is one embodiment, where water ballast system 170 is utilized in association with liquid cargo, water ballast system 170 includes at least one liquid cargo pump 173 associated with each liquid cargo storage tank 144, at least one water ballast pump 175 associated with each water ballast tank 172, a water ballast sensor 174 to measure a condition of the water ballast and a liquid cargo sensor 176 to measure a condition of the liquid cargo. For example, in some embodiments, water ballast sensor 174 may be a flow meter to measure the flow rate of water ballast into or out of a water ballast tank 172 while in other embodiments, water ballast sensor 174 may be a liquid level sensor to measure the level of water ballast in a water ballast tank 172.

Likewise, in some embodiments, liquid cargo sensor 176 may be a flow meter to measure the flow rate of liquid cargo into or out of a liquid cargo storage tank 144, while in other embodiments, liquid cargo sensor 176 may be a liquid level sensor to measure the level of liquid cargo in a liquid cargo storage tank 144. Control system 171 includes a controller 177 disposed to monitor sensors 174, 176 to measure inflow and outflow and/or fluid levels with respect to liquid cargo tank(s) 144 and water ballast tanks 172, and operate liquid pumps 173, 175 to maintain a desired waterline (draft, trim, heel, and therefore hydrostatics) and deadweight distribution (of mass namely extents and centers of gravity, and therefore mass inertias) during any particular liquid cargo loading or offloading, such as maintaining these at substantially constant waterline and deadweight distribution. Being interconnected to each of the water ballast pump(s) 175, liquid cargo pump(s) 173, water ballast sensor(s) 174, and liquid cargo sensor(s) 176, controller 177 can compare the volume of water ballast to the volume of liquid carbon dioxide flow and adjust the water ballast pump(s) 175 and/or, the liquid cargo pump(s) 173 based on the compared volumes. In some embodiments, water ballast volumes and liquid cargo volumes can be determined by measuring the flow into and out of the respective tanks.

Water ballast tanks 172 may be located adjacent the port and starboard sides of marine vessel 210. Thus, as shown, water ballast tank 172*b* is adjacent side 118 of marine vessel 210 and water ballast tank 172*c* is adjacent side 122 of marine vessel 210. Again, being adjacent the sides 118, 122 of marine vessel 210 (as opposed to along the bottom of marine vessel 210), the draft of marine vessel 210 can be minimized, as can the size of any water ballast tank 172 positioned adjacent the bottom of hull 114. In FIG. 10*a*, water ballast tank 172*a* is shown symmetrically positioned about the centerline plane 130. Notably, in some embodiments, each water ballast tank 172 includes a separate pump 175 that can be separately controlled to achieve balancing as described herein. Thus, water ballast tank 172*a* is shown with pump 175*a*, water ballast tank 172*b* is shown with pump 175*b*, water ballast tank 172*c* is shown with pump 175*c*, water ballast tank 172*d* is shown with pump 175*d* and water ballast tank 172*e* is shown with pump 175*e*. Thus, during loading of liquid cargo to liquid cargo tanks 144, liquid cargo sensor 176 can be monitored so that water ballast pumps 175 can be operated to discharge an equivalent volume by weight of water from water ballast tanks 172 at a balancing water flowrate as measured by water sensor 174. Similarly, during offloading of liquid cargo from liquid cargo tanks 144, liquid cargo sensor 176 can be monitored so that water ballast pumps 175 can be operated to intake an equivalent volume by weight of water from an external water source (not shown) at a balancing water flowrate as measured by water sensor 174. It will be appreciated that while various pumps 173, 175 are depicted within a tank, they need not be so long as they can pump fluid into and out of tanks as required. Moreover, separate pumps 173, 175 may be used for intake and discharge, whether for liquid cargo tanks 144 or water ballast tanks 172, respectively. In addition, and in other embodiments, a draft sensor 179 disposed to measure the draft of marine vessel 210 may also be utilized to augment or as a substitute for one or more of the water ballast sensor(s) 174, and liquid cargo sensor(s) 176.

In one or more embodiments, the total weight of water ballast loaded to a particular cargo hold is proportional to the total weight of liquid cargo offloaded from the particular cargo hold based on the density of the water ballast and the density of the liquid cargo. In one or more embodiments, the proportion is 1:1, where the weight of ballast water loaded to a particular cargo hold is equivalent to the weight of the liquid cargo being offloaded from the particular cargo hold. In other embodiments, the proportion of water ballast weight to liquid cargo weight may be different than 1:1.

Likewise, in one or more embodiments, the total weight of water ballast offloaded from a particular cargo hold is proportional to the total weight of liquid cargo loaded to the particular cargo hold based on the density of the water ballast and the density of the liquid cargo. In one or more embodiments, the proportion is 1:1, where the weight of ballast water offloaded from a particular cargo hold is equivalent to the weight of the liquid cargo being loaded to the particular cargo hold. In other embodiments, the proportion of water ballast weight to liquid cargo weight may be different than 1:1.

In some embodiments, such water ballast tanks 172 may include additional capacity above the capacity of liquid cargo storage tanks 144 to facilitate additional ballasting activities, permitting flexibility to actively vary the draft/freeboard in mooring at a marine terminal that may require the marine vessel 210 to sit higher or lower in the water to facilitate mooring. Likewise, in some embodiments, such water ballast tanks 172 may include additional capacity above the capacity of liquid cargo storage tanks 144 to facilitate additional ballasting activities, permitting flexibility to actively vary the water ballast deadweight and it's distribution and hence the draft/freeboard, hydrostatics, centers of gravity and mass inertias etc. in order to further detune and hence minimize motions with regard to the wave environment (sea state, metocean characteristics) being encountered at a particular instance by marine vessel 210.

Where the marine vessel 210 having a water ballast system 170 as described also include an onboard liquefaction system 148 and liquid cargo storage tanks are liquified carbon dioxide cargo storage tanks, such as carbon dioxide transport and sequestration marine vessel 100 of FIG. 2, it will be appreciated that the water ballast system 170 may be operated to accommodate for the weight of the liquified carbon dioxide as it is produced by the onboard liquefaction system 148 and stored in the onboard liquified carbon dioxide cargo storage tanks 144. In such case, the weight of the gas being onboarded is negligible compared to the weight of the liquified carbon dioxide being produced, and in such case, the water ballast system 170 is operated based on the liquified carbon dioxide being produced rather than the carbon dioxide gas being onboarded for processing the liquefaction system 148.

Control system 171 of water ballast system 170 is utilized to control the flow of water ballast, typically in the form of seawater, pumped into or out of water ballast tanks 172 in order to negate any liquid cargo and/or consumables induced deadweight immersion and trimming and heeling moments, both when loading and discharging liquid cargo, as well as during movement of marine vessel 210 (hence consuming fuel and water etc.), so that the deadweight (cargo and consumables) and associated centers of gravity remain substantially constant and coincident with the centers of buoyancy, therefore ensuring that the marine vessel 210 can operate at a single substantially constant waterline (draft, trim and heel) over all loading evolutions.

Some of the safety and operability advantages whilst in a port are:

- simplifies and maximizes the safety of the shore-ship gangway interface;
- de-constrains and hence extends the range of suitable reception quays;
- simpler, safer and more operable mooring arrangements;
- significantly simplifies the selection and design, and hence safety, of the gaseous, and possibly liquid, carbon dioxide loading/transfer system(s);
- simplifies the design, and hence safety, of the shore-ship electrical supply system(s);
- simplifies the design, and hence safety, of the bunkering and storing systems and operations;
- potential simplification of marine cooling system(s) etc.

Some of the safety and operability advantages whilst sailing are:

- simplifies and maximizes the safety of the pilot access/egress;
- potential simplification of marine cooling system(s) etc.;
- optimization of hull form for minimum resistance, both still water and in a seaway;
- iv. aft hull form (lines) designed to be sympathetic to suit the most efficient propulsor (propellers etc.) type(s) and also to optimize the flow into and immersion of the propulsors in question, maximize the hull propulsive characteristics, etc.;
- selection of most efficient propulsion system(s) architecture and optimal efficiency propulsors.

Some of the safety and operability advantages whilst moored offshore/nearshore are:

- potential simplification of marine cooling system(s) etc.;
- simplified buoy, connector etc. attachment/detachment operations;
- simplified design process for the mooring system;
- simplified design process for the buoy, connector etc.;
- simplified design process for the buoy, connector etc. structure(s).

One benefit of a substantially constant waterline is that this results in the hydrostatics (buoyancy, metacenter etc.) being substantially constant and therefore (due to the deadweight centers of gravity also being substantially constant) ensures that the marine vessel 210 operates with substantially constant initial (metacentric height) and high angle stability characteristics over all loading evolutions.

In addition, water ballast tank 172 intake and discharge are selected so as to negate any change in individual zone deadweight extents and hence (due to the deadweight and centers of gravity also being substantially constant) results in substantially constant hull girder loads. This in turn ensures (due to the buoyancy and centers also being substantially constant) that the marine vessel 210 operates with substantially constant still water hull girder loading (shearing force and bending moment) characteristics over all loading evolutions.

Some of the advantages of this are:

- simplification and optimization of global ship structural design;
- simplification of local ship structural design;
- structural integration of carbon dioxide cargo process systems etc.;
- simplification of fatigue calculations, reduction of low cycle fatigue.

By utilizing a water ballast system 170 as described herein, a substantially constant waterline may be maintained, resulting in hydrodynamics (added mass and damping) that are substantially constant. With the deadweight extents also being maintained, the result is substantially constant mass inertias, hence, with the hydrostatics and stability also being substantially constant. Therefore, the marine vessel 210 is ensured to operate with substantially constant motion characteristics over all loading evolutions. The motion characteristics can also be further detuned through utilization of the water ballast system 170 to change (reduce or increase) the amount and distribution of water ballast in order to change the natural periods and hence detune the marine vessel 210 if required to minimize motions when operating in a specific wave environment (sea state, metocean characteristics).

Some of the safety and efficiency advantages whilst sailing are:

- maximization of the safety of onboard personnel operations;
- maximization of the safety of the pilot access/egress;
- minimization of added resistance in a seaway;
- minimization of added resistance/and thrust vectoring;
- maximization of propulsor efficiency.

Some of the safety and operability advantages whilst mooring/moored/disconnecting offshore/nearshore are:

- maximization of the safety of onboard personnel operations;

maximization of overall operational uptime;
simplified design process for the mooring system;
simplified design process for the buoy, connector etc.;
simplified design process for the buoy, connector etc. structure(s);
simplified structural, and also system, design and integration of the cargo process systems.

It will be appreciated that in deadweight cargo carrying marine vessels of the prior art, water ballast is provided only to the degree necessary to maintain positive stability of the marine vessel and immersion of the propeller(s). However, when such deadweight cargo marine vessels are unloaded, the draft and trim are significantly different than when the deadweight cargo marine vessels are fully loaded. Typically, the draft and trim may vary by as much as approximately 7 meters (half of full load) and 3.5 meters by the stern (from even keel) respectively between full load and unloaded (ballast) loading conditions for deadweight cargo marine vessels of similar dimensions to this marine vessel, as the water ballast weight capacity of such cargo deadweight marine vessels can typically be as little as one-third of the cargo deadweight. In addition, the majority of water ballast tanks on such cargo deadweight marine vessels of the prior art are located in double bottoms against the bottom shell below the cargo and consumable tanks with only a minority accommodated against the side shell adjacent to the cargo and consumables tanks. The consequence of this is that not only does the longitudinal center of gravity not coincide with the longitudinal center of buoyancy when unloaded with only water ballast (hence, as detailed above a stern trim resulting) but also resulting in a much lower vertical center of gravity—approximately two-thirds of full load. As a consequence of this lower vertical center of gravity combined with a much higher metacenter of approximately one-third greater than full load (due to the lesser draft) results in a much larger metacentic height of about three times of that for full load, and hence significantly different stability, still water shearing force/bending moment and motions characteristics for the prior art marine vessels as the type of cargo and amount of cargo on board varies. In contrast, the water ballast system 170 of the disclosure permits these characteristics of marine vessel 210 to be maintained regardless of the type of cargo or amount of cargo on board marine vessel 210.

The water ballast system 170 as described herein maintains a substantially constant draft and trim (and heel) for marine vessel 210, whether the liquid cargo storage tanks 144 are empty or full. This is accomplished in part by providing water ballast tanks 172, in some embodiments, with a total volume that is approximately 7% to 10% greater than the total volume of the liquid cargo storage tanks 144, such as the liquefied carbon dioxide tanks. In other words, in these embodiments, a ratio of approximately 1.075 to 1 of water ballast tank volume to liquid cargo tank volume, where the ratio is based on the density of seawater at standard temperature and pressure to the density of liquified carbon dioxide. Of course, in other embodiments, the total volume of the water ballast tanks may be greater than this ratio. For example, in the case of carbon dioxide transport and sequestration marine vessel 100 as described herein with a net liquid carbon dioxide tank total volume of 30,000 cubic meters would include water ballast tank total volume of at least 32,224 cubic meters. In other embodiments, the water ballast tank total volume may be more than 7% to 10% greater than the liquid carbon dioxide tank total volume to further enhance operational flexibility, safety and performance of the carbon dioxide transport and sequestration marine vessel 100. In other embodiments, the water ballast tank total volume may be approximately the same as the liquid carbon dioxide tank total volume. In any event, in one or more embodiments, a substantial portion of the water ballast tanks may be positioned within the hull in such a way as to maintain substantially constant displacement and weight distribution. As a consequence, the centers of gravity and mass extents, the waterline, hydrostatics and hydrodynamics, hull girder loads, mass inertias, etc. of the carbon dioxide transport and sequestration marine vessel 100 are also maintained substantially constant. Therefore, the water ballast system as described herein results in this deadweight cargo carbon dioxide transport and sequestration marine vessel 100 having the distinctive ability to maintain not only freeboard but also uniquely stability, still water shearing force and bending moment characteristics and motion characteristics substantially constant over all operational (loading, transporting loaded or unloaded; and offloading) and non-operational loading evolutions. As used herein, unless otherwise noted, unloading and offloading may be used interchangeably.

It will be appreciated that at least carbon dioxide transport and sequestration marine vessel 100 as described herein is typically not intended for long voyages, but rather for shorter routes between the first location and the second location as described above with respect to FIG. 1. Moreover, for a majority of the time at sea, likely over 80%, the carbon dioxide transport and sequestration marine vessel 100 will be moored offshore as described, for carbon dioxide injection activities. The water ballast system 170 as described herein is particularly desirable for such a carbon dioxide transport and sequestration marine vessel 100 because the water ballast system 170 is selected to detune the marine vessel 100 for the prevalent metocean characteristics—the reason the water ballast system 170 maintains a substantially constant waterline (draft, trim, heel, and therefore hydrostatics) and deadweight distribution (of mass namely extents and centers of gravity, and therefore mass inertias), and can also be further detune the marine vessel 100 through changing (reducing or increasing) the amount and distribution of water ballast in order to change the natural periods and hence detune the marine vessel if required to minimize motions in a specific wave environment (sea state, metocean characteristics) being/to be encountered. This is in contrast to prior art cargo deadweight marine vessels that are designed for long voyage, worldwide service and with dimensions for minimum lightship, to suit construction facilities and maybe then for resistance within stability limits etc. as opposed to minimum motions.

Thus, various embodiments of a marine vessel have been described. In one or more embodiments, a carbon capture and sequestration marine vessel includes a self-propelled, buoyant vessel having an elongated hull with a first hull side and an opposing second hull side, a first hull end and a second hull end and defining a centerline plane extending from the first hull end to the second hull end between the two hull sides, substantially bisecting the hull, with a keel between the first and second hull ends; an upper deck extending between the hull sides so as to define a hull volume within the hull; at least one liquified carbon dioxide storage tank within the hull; and a carbon dioxide liquefaction system carried by the buoyant vessel. In other embodiments, the carbon capture and sequestration marine vessel includes a self-propelled, buoyant vessel having an elongated hull with a first hull side and an opposing second hull side, a first hull end and a second hull end, with a keel between the first and second hull ends; an upper deck extending between the hull sides so as to define a volume within the hull; at least one liquified carbon dioxide storage tank within the hull; a carbon dioxide liquefaction system carried by the buoyant vessel and in fluid communication with the at least one liquefied carbon dioxide storage tank upstream of the at least one liquified carbon dioxide storage tank; and a carbon dioxide supercritical system carried by the buoyant vessel in fluid communication with the at least one liquified carbon dioxide storage tank downstream of the at least one liquified carbon dioxide storage tank. In other embodiments, the carbon capture and sequestration marine vessel includes a buoyant vessel having an elongated hull with a first hull side and an opposing second hull side, a first hull end and a second hull end; an upper deck extending between the hull sides so as to define a hull volume within the hull; at least one liquified carbon dioxide storage tank within the hull; a carbon dioxide liquefaction system carried by the buoyant vessel and in fluid communication with the at least one liquefied carbon dioxide storage tank upstream of the at least one liquified carbon dioxide storage tank; and a carbon dioxide supercritical system carried by the buoyant vessel in fluid communication with the at least one liquified carbon dioxide storage tank downstream of the at least one liquified carbon dioxide storage tank. In other embodiments, a marine vessel includes a self-propelled, buoyant vessel having an elongated hull with a first hull side and an opposing second hull side, a first hull end and a second hull end and defining a centerline plane extending from the first hull end to the second hull end between the two hull sides, substantially bisecting the hull; a propulsion system having one or more piston engines, each piston engine having a combustion flue gas exhaust; and a carbon dioxide capture system having an absorber with an aqueous solution circulating therethrough and a desorber, wherein the desorber is in thermal communication with the flue gas exhaust of one or more gas turbines. In other embodiments, a marine vessel includes a self-propelled, buoyant vessel having an elongated hull with a first hull side and an opposing second hull side, a first hull end and a second hull end and defining a centerline plane extending from the first hull end to the second hull end between the two hull sides, substantially bisecting the hull; a propulsion system having one or more piston engines, each piston engine having a combustion flue gas exhaust; a carbon dioxide capture system having an absorber and a desorber, the absorber in fluid communication with the flue gas exhaust and having an aqueous solution circulating therethrough, wherein the desorber is in thermal communication with the flue gas exhaust of one or more gas turbines; and a carbon dioxide liquefaction system carried by the buoyant vessel and in fluid communication with the a carbon dioxide capture system. In other embodiments, a marine vessel includes a buoyant vessel having an elongated hull with a first hull side and an opposing second hull side, a first hull end and a second hull end and defining a centerline plane extending from the first hull end to the second hull end between the two hull sides, substantially bisecting the hull; an upper deck extending between the hull sides so as to define at least one cargo hold with a cargo hold volume; at least two liquified carbon dioxide storage tanks within the at least one cargo hold and filling at least 40% of the cargo hold volume, wherein the liquified carbon dioxide storage tanks within the at least one cargo hold together has a total liquid cargo volume; a plurality of water ballast tanks disposed within the at least one cargo hold, wherein the total water ballast volume of the plurality of water ballast tanks within a cargo hold is greater than the total liquid cargo volume of the liquified carbon dioxide storage tanks within the cargo hold; and a carbon dioxide liquefaction system carried by the buoyant vessel and in fluid communication with the liquified carbon dioxide storage tanks. In other embodiments, a marine vessel includes a buoyant vessel having an elongated hull with a first hull side and an opposing second hull side, a first hull end and a second hull end and defining a centerline plane extending from the first hull end to the second hull end between the two hull sides, substantially bisecting the hull; an upper deck extending between the hull sides so as to define at least one cargo hold with a cargo hold volume; at least one liquified carbon dioxide storage tank within the at least one cargo hold and filling at least 40% of the cargo hold volume, wherein the liquified carbon dioxide storage tanks within the at least one cargo hold together has a total liquid cargo volume; a plurality of water ballast tanks disposed within the at least one cargo hold, wherein the total water ballast volume of the plurality of water ballast tanks within a cargo hold is greater than the total liquid cargo volume of the liquified carbon dioxide storage tanks within the cargo hold, and wherein a first portion of a plurality of water ballast tanks within the cargo hold are bottom water ballast tanks, a second portion of the plurality of water ballast tanks within the cargo hold are side water ballast tanks, and a third portion of the plurality of water ballast tanks within the cargo hold are upper water ballast tanks; a carbon dioxide liquefaction system carried by the buoyant vessel and in fluid communication with the liquified carbon dioxide storage tanks; and a carbon dioxide supercritical system carried by the buoyant vessel in fluid communication with the at least one liquified carbon dioxide storage tank downstream of the at least one liquified carbon dioxide storage tank. In other embodiments, a marine vessel includes a self-propelled, buoyant vessel having an elongated hull with a first hull side and an opposing second hull side, a first hull end and a second hull end and defining a centerline plane extending from the first hull end to the second hull end between the two hull sides, substantially bisecting the hull; a plurality of separate cargo holds defined within the hull, each cargo hold having a cargo hold volume; at least one liquid storage tank within each of the plurality of separate cargo holds, wherein the liquid storage tanks within each of the plurality of separate cargo holds has a total liquid cargo volume; and one or more water ballast tanks symmetrically arranged about the centerline plane within each cargo hold, wherein the total water ballast volume of the one or more water ballast tanks within a hold is greater than the total liquid cargo volume of the liquid storage tanks within the hold. In other embodiments, a marine vessel includes a self-propelled, buoyant vessel having an elongated hull with a first hull side and an opposing second hull side, a first hull end and a second hull end, with a keel between the first and second hull ends; an upper deck extending between the hull sides so as to define a volume within the hull; at least two cargo holds are separately defined within the volume within the hull; at least two liquid cargo storage tanks deployed in each cargo hold, the liquid cargo storage tanks within a hold having a total liquid cargo volume; and a water ballast system within each hold and adjacent the liquid cargo storage tanks, wherein the water ballast system comprises a plurality of water ballast tanks, the plurality of water ballast tanks within a hold having a total water volume, wherein the total water volume of the water ballast tanks within each hold is equal to or greater than the total liquid cargo volume of the liquid cargo storage tanks within each hold. In other embodiments, a marine vessel includes a self-propelled, buoyant vessel having an elongated hull with a first hull side and an opposing second hull side, a first hull end and a second hull end and defining a centerline plane extending from the first hull end to the second hull end between the two hull sides, substantially bisecting the hull; a plurality of separate cargo holds defined within the hull, each cargo hold having a cargo hold volume; at least one liquid storage tank within each of the plurality of separate cargo holds, wherein the liquid storage tanks within each of the plurality of separate cargo holds has a total liquid cargo volume; and one or more water ballast tanks symmetrically arranged about the centerline plane within each cargo hold, wherein the total water ballast volume of the one or more water ballast tanks within a hold is at least 80% of the total liquid cargo volume of the liquid storage tanks within the hold.

Any of the foregoing marine vessel embodiments may include one or more of the following elements alone or in combination with any other elements:

A carbon dioxide liquefaction system carried by the buoyant vessel.

At least one liquified carbon dioxide storage tank within the hull and in fluid communication with the carbon dioxide liquefaction system.

The carbon dioxide liquefaction system is on or above the upper deck.

The carbon dioxide supercritical system is on or above the upper deck.

The carbon dioxide liquefaction system is at least partially within the hull.

The carbon dioxide supercritical system is at least partially within the hull.

The carbon dioxide liquefaction system is wholly within the hull.

The carbon dioxide supercritical system is wholly within the hull.

The carbon dioxide liquefaction system is above the liquified carbon dioxide storage tank.

The carbon dioxide supercritical system is above the liquified carbon dioxide storage tank.

The carbon dioxide liquefaction system is adjacent to the liquified carbon dioxide storage tank.

The carbon dioxide supercritical system is adjacent to the liquified carbon dioxide storage tank.

The carbon dioxide liquefaction system is water cooled.

The carbon dioxide liquefaction system is air cooled.

The heat exchanger of the carbon dioxide liquefaction system is water cooled.

The heat exchanger of the carbon dioxide liquefaction system is air cooled.

The carbon dioxide liquefaction system comprises a compressor and a heat exchanger in series together defining a liquefaction stage.

The carbon dioxide liquefaction system comprises five liquefaction stages.

The carbon dioxide liquefaction system comprises at least three liquefaction stages.

The carbon dioxide liquefaction system comprises a plurality of liquefaction stages arranged in series between the inlet and the outlet of the carbon dioxide liquefaction system.

The heat exchanger comprises a refrigeration system having an evaporator, a refrigerant compressor, an expansion valve and an air-cooled condenser.

The carbon dioxide liquefaction system comprises a compressor, a heat exchanger in fluid communication with the compressor downstream of the compressor and a separator in fluid communication with the heat exchanger, downstream of the heat exchanger.

The liquefaction stage further comprises a separator.

The marine vessel is self-propelled.

The heat exchanger is a closed-loop refrigeration system circulating refrigerant.

The carbon dioxide liquefaction system comprises a plurality of compressors arranged in series and a cryogenic pump.

The carbon dioxide liquefaction system comprises a compressor in fluid communication with the gaseous carbon dioxide source and a cryogenic pump downstream of the compressor and in fluid communication with a liquid carbon dioxide storage tank.

The carbon dioxide liquefaction system comprises a compressor in fluid communication with the gaseous carbon dioxide source, a cryogenic pump downstream of the compressor and in fluid communication with a liquid carbon dioxide storage tank and a heat exchanger fluidically disposed between the compressor and the cryogenic pump.

A carbon dioxide supercritical system.

The carbon dioxide supercritical system comprises one or more pumps and one or more trim heaters to control the temperature of the supercritical carbon dioxide at or near ambient temperatures.

The carbon dioxide supercritical system comprises a compressor.

The carbon dioxide supercritical system comprises a cryogenic pump.

A submerged buoy system positioned adjacent the bottom of the hull of the marine vessel.

A submerged buoy system positioned below all drafts of the marine vessel.

A submerged buoy system positioned adjacent the keel of the marine vessel.

An above-water coupling system positioned adjacent the upper deck of the hull of the marine vessel.

An above-water coupling system positioned above all drafts of the marine vessel.

Pipework extending below the upper deck to interconnect the carbon dioxide liquefaction system and the liquified carbon dioxide storage tanks.

A multi-deck accommodation structure positioned adjacent the bow of the marine vessel.

A multi-deck accommodation structure positioned adjacent the stern of the marine vessel.

A multi-deck accommodation structure positioned adjacent the upper deck of the marine vessel with propulsion and/or other engines and/or propulsion system positioned below the multi-deck accommodation structure.

A forward machinery space that contains the propulsion and/or other engines and associated equipment.

An aft machinery space that contains the propulsors and associated equipment.

An aft machinery space that contains the propulsion and/or other engines and associated equipment, propulsors and associated equipment.

A forward space(s) that contains propulsion batteries and associated equipment.

An aft space(s) that contains propulsion batteries and associated equipment.

A gaseous carbon dioxide loading manifold in fluid communication with the carbon dioxide liquefaction system.

A liquid carbon dioxide loading manifold in fluid communication with the liquified carbon dioxide storage tanks, and the carbon dioxide liquefaction system.

A liquid carbon dioxide export manifold in fluid communication with the carbon dioxide supercritical system.

A liquid carbon dioxide offloading manifold in fluid communication with the liquified carbon dioxide storage tanks.

A liquid carbon dioxide conveyance system extending from the carbon dioxide supercritical system, or liquified carbon dioxide storage tanks, to a carbon dioxide injection wellhead, or any storage facility or consumer.

The marine vessel of any claim, wherein the carbon dioxide liquefaction system comprises a gaseous carbon dioxide inlet, one or more compressors in fluid communication with the gaseous carbon dioxide inlet, and a liquid carbon dioxide outlet in fluid communication with the one or more compressors.

The liquid carbon dioxide outlet is in fluid communication the liquified carbon dioxide storage tank(s).

The carbon dioxide liquefaction system comprises a plurality of heat exchangers.

The carbon dioxide supercritical system comprises a high-pressure pump and a trim heater.

The trim heater includes one or more heat exchangers.

The high-pressure pump is capable of pressurizing liquid carbon dioxide at least five times its storage pressure within a storage tank.

The carbon dioxide supercritical system comprises a plurality of high-pressure pumps and trim heaters alternatingly arranged in staged succession.

The carbon dioxide supercritical system comprises a plurality of high-pressure pumps arranged in parallel.

The carbon dioxide supercritical system comprises at least one trim heater downstream of a high-pressure pump.

The carbon dioxide supercritical system comprises a heat exchanger.

At least one cargo hold is defined within the volume within the hull.

At least two cargo holds are separately defined within the volume within the hull.

At least three cargo holds are defined within the volume within the hull.

One or more cargo holds are defined within the volume within the hull.

At least three cargo holds are defined within the volume within the hull, with each cargo hold has three liquified carbon dioxide storage tanks deployed therein.

At least two cargo holds separately defined within the volume within the hull with each cargo hold having at least two liquified carbon dioxide storage tanks deployed in each cargo hold.

The liquified carbon dioxide storage tanks fill at least forty percent of the volume defined by the hull.

At least one liquified carbon dioxide storage tank in each cargo hold.

At least two liquified carbon dioxide storage tanks in each cargo hold.

Three liquified carbon dioxide storage tanks in each cargo hold.

The three liquified carbon dioxide storage tanks are symmetrically arranged about the centerline plane.

Each liquified carbon dioxide storage is elongated and cylindrical, bi-lobe or tri-lobe, and extends along a main storage tank axis.

The three liquified carbon dioxide storage tanks are each cylindrical, bi-lobe or tri-lobe, and each extends along a main storage tank axis, wherein the three carbon dioxide storage tanks are arranged in the cargo hold so that the main storage tank axis of each storage tank is parallel with the centerline plane.

The marine vessel is approximately 230 meters in length.

Each liquified carbon dioxide storage tank has a volume of approximately 3,700 cubic meters at 100% filling ratio.

Each liquified carbon dioxide storage tank is approximately 47 meters long and 10 meters in diameter.

Each liquified carbon dioxide storage tank is an IMO Type 'C' approximately 47 meters long and 10 meters in diameter with a pressure rating of at least 15 bar.

A propulsion system having one or more piston engines, each piston engine having a combustion flue gas exhaust.

A propulsion system having a plurality of piston engines, each piston engine having a combustion flue gas exhaust.

A propulsion system having one or more gas turbines, each gas turbine having a combustion flue gas exhaust.

A propulsion system having a plurality of gas turbines, each gas turbine having a combustion flue gas exhaust.

A propulsion system having a plurality of batteries, to facilitate propulsion without engines or turbines and hence any exhaust.

A carbon dioxide capture system having an absorber with an aqueous solution circulating therethrough and a desorber, wherein the desorber is in thermal communication with the flue gas exhaust of one or more internal combustion engines.

A carbon dioxide capture system having an absorber with an aqueous solution circulating therethrough and a desorber, wherein the desorber is in thermal communication with the flue gas exhaust of one or more internal combustion engines and the exhaust of one or more gas turbines.

A primary heat source in thermal communication with the desorber.

A primary heat source and a secondary heat source each in thermal communication with the desorber.

The primary heat source comprises one or more gas turbines.

The secondary heat source comprises one or more piston engines of the propulsion/generating system.

The secondary heat source comprises one or more diesel/dual fuel/tri fuel/etc. piston engines.

One or more gaseous carbon dioxide temporary storage tanks in fluid communication with the desorber.

One or more gaseous carbon dioxide storage temporary tanks are in fluid communication with the carbon dioxide liquefaction system.

The marine vessel of any claim, further comprising a carbon dioxide capture system having an absorber with an aqueous solution circulating therethrough; a desorber and a heat exchanger, wherein the absorber is in thermal communication with the heat exchanger and the heat exchanger is in fluid communication with the flue gas exhaust of one or more piston engines.

A carbon dioxide capture system having an absorber with an aqueous solution circulating therethrough; a desorber and a heat exchanger, wherein the desorber is in thermal communication with the heat exchanger and the heat exchanger is in fluid communication with the flue gas exhaust of one or more piston engines and one or more gas turbines.

A primary heat source in thermal communication with the desorber.

A primary heat source and a secondary heat source each in thermal communication with the desorber via a heat exchange.

The heat exchanger is in fluid communication with the absorber of the carbon dioxide capture system.

The primary heat source is one or more gas turbines.

The secondary heat source is one or more diesel/dual fuel/tri fuel/etc. piston engines of a propulsion system.

The secondary heat source is one or more diesel/dual fuel/tri fuel/etc. piston engines.

The aqueous solution is amine.

One or more gaseous carbon dioxide storage tanks in fluid communication with the desorber.

One or more gaseous carbon dioxide storage tanks are in fluid communication with the carbon dioxide liquefaction system.

A gaseous carbon dioxide compressor in fluid communication with the desorber and the gaseous carbon dioxide storage tank.

The marine vessel of any claim, further comprising a water ballast system within each hold.

A water ballast system within each cargo hold and adjacent the liquid cargo storage tanks.

The liquid cargo storage tanks fill at least forty percent of the hull volume.

Each cargo hold has a cargo hold volume.

The liquid cargo storage tanks fill at least thirty percent of the cargo hold volume.

The liquid cargo storage tanks fill at least forty percent of the cargo hold volume.

The liquid cargo storage tanks within a hold having a total liquid cargo volume.

The water ballast tanks within a cargo hold having a total water volume.

The total water volume of the water ballast tanks within a cargo hold is equal to or greater than the total liquid cargo volume of the liquid cargo storage tanks within the cargo hold.

The water ballast system within each cargo hold comprises a plurality of water ballast tanks.

The water ballast system within each cargo hold comprises at least a first water ballast tank, a second water ballast tank, a third water ballast tank, a fourth water ballast tank, and a fifth water ballast tank, or more water ballast tanks.

A water ballast system comprising a water ballast pump, a liquid carbon dioxide pump, a water ballast flow meter and/or tank fluid level sensor, a liquid carbon dioxide flow meter and/or tank fluid level sensor, possibly in concert with draft and other sensors, and a controller that can compare the volume of water ballast flow to the volume of liquid carbon dioxide flow and adjust the pumps based on the compared volumes (and possibly also draft).

A water ballast system comprising a water ballast pump, various consumables (fuels, oils, waters, etc.) pumps, a water ballast flow meter and/or tank fluid level sensor, various consumable flow meters and/or tank fluid level sensors, possibly in concert with draft and other sensors and a controller that can compare the volume of water ballast flow to the volume of consumables and adjust the pumps based on the compared volumes (and possibly also draft).

The total capacity of all water ballast tanks within a cargo hold is equal to or greater than the total loaded weight of all liquid cargo storage tanks within the cargo hold.

The liquid cargo storage tanks are liquid at standard temperature and pressure storage tanks.

The liquid cargo storage tanks are liquified gas storage tanks.

The liquid cargo storage tanks are liquified carbon dioxide storage tanks.

A liquid cargo storage tank having a first total capacity and a water ballast tank having a second total capacity that results in a weight equal to or larger than the first total capacity.

A liquid cargo storage tank having a first total capacity and one or more water ballast tanks having a second total capacity that results in a weight equal to or larger than the first total capacity.

The total capacity of all water ballast tanks within a consumables bunkers zone is equal to or greater than the total loaded weight of all consumables tanks within the zone.

A consumables bunker storage having a first total capacity and a water ballast tank having a second total capacity that results in a weight equal to or larger than the first total capacity.

A consumables bunker storage having a first total capacity and one or more water ballast tanks having a second total capacity that results in a weight equal to or larger than the first total capacity.

One or more liquid cargo storage tanks symmetrically arranged about the centerline plane within a hold; and one or more water ballast tanks symmetrically arranged about the centerline plane within a cargo hold.

One or more liquid cargo storage tanks within a cargo hold symmetrically arranged about the centerline plane; and one or more water ballast tanks within the cargo hold symmetrically arranged about the centerline plane.

One or more liquified carbon dioxide storage tanks within a cargo hold collectively having a first total capacity and one or more water ballast tanks within a hold collectively having a second total capacity, wherein the second total capacity is equal to or larger than the first total capacity.

A first liquified carbon dioxide storage tank, a second liquified carbon dioxide storage tank, a third liquified carbon dioxide storage tank, a first water ballast tank; and a second water ballast tank all disposed within each of two or more cargo holds.

A first liquified carbon dioxide storage tank, a second liquified carbon dioxide storage tank, a third liquified carbon dioxide storage tank, a first water ballast tank; a second water ballast tank; a third water ballast tank, a fourth water ballast tank and fifth water ballast tank, all disposed within each of two or more cargo holds.

A first liquid cargo storage tank positioned along the centerline plane, a second liquid cargo storage tank spaced apart from the centerline plane adjacent the first side of the hull and a third liquid cargo storage tank spaced apart from the centerline plane adjacent the second side of the hull.

A first liquid cargo storage tank positioned along the centerline plane within each cargo hold, a second liquid cargo storage tank spaced apart from the centerline plane adjacent the first side of the hull within each hold and a third liquid cargo storage tank spaced apart from the centerline plane adjacent the second side of the hull within each cargo hold, wherein the first liquid cargo storage tank is positioned above the second and third liquid cargo storage tank within the cargo hold.

Each water ballast tank is elongated and extends along a water ballast tank axis.

The second and fourth water ballast tanks are adjacent a first side of the hull within each cargo hold, the third and fifth water ballast tanks are adjacent the second side of the hull within each cargo hold, and the first water ballast tank is disposed along the centerline plane within each cargo hold.

The fourth and fifth water ballast tanks are positioned above the second and third liquid cargo storage tanks; and the first, second and third water ballast tanks are positioned below the second and third liquid cargo storage tanks.

A water ballast system comprising at least one water ballast pump, at least one liquid cargo pump, a water flow meter and/or tank fluid level sensor, a liquid cargo flow meter and/or tank fluid level sensor, and possibly draft and other sensors.

The water ballast system further comprises a controller interconnected to each of the at least one water ballast pump, at least one liquid carbon dioxide pump, a water ballast flow meter and/or tank fluid level sensor, and a liquid carbon dioxide flow meter and/or tank fluid level sensors, possibly in concert with draft and other sensors, wherein the controller is disposed to compare the volume of water ballast flow to the volume of liquid carbon dioxide flow and adjust the at least one water ballast pump, at least one liquid carbon dioxide pump based on the compared volumes (and possibly also draft).

A water ballast system comprising a plurality of water ballast pumps, a plurality of liquid carbon dioxide pumps, a water ballast flow meter(s) and/or tank fluid level sensors disposed to measure water ballast flow through the plurality of water ballast pumps, a liquid carbon dioxide flow meter(s) and/or tank fluid level sensor(s) disposed to measure liquid carbon dioxide flow through the plurality of liquid carbon dioxide pumps.

The water ballast system further comprises a controller interconnected to each of the plurality of water ballast pumps, plurality of liquid cargo pumps, the water ballast flow meters and/or tank fluid level sensors, and the liquid cargo flow meters and/or tank fluid level sensors, possibly in concert with draft and other sensors, wherein the controller can compare the volume of water ballast flow and flowrate to the volume of liquid cargo flow and flowrate and adjust the plurality of water ballast pumps and the plurality of liquid cargo pumps based on the compared volumes and flowrates (and possibly also draft). The total capacity of all water ballast tanks within a cargo hold is equal to or greater than the total loaded weight of all liquid storage tanks within the cargo hold.

A plurality of liquid cargo storage tanks within two or more cargo holds; and a plurality of water ballast tanks within each of the two or more cargo holds.

One or more liquid cargo storage tanks symmetrically arranged about the centerline plane within each cargo hold; and one or more water ballast tanks symmetrically arranged about the centerline plane within each cargo hold.

Three or more liquid cargo storage tanks symmetrically arranged about the centerline plane within a cargo hold; and three or more water ballast tanks symmetrically arranged about the centerline plane within the cargo hold.

One or more liquid cargo storage tanks within a cargo hold collectively having a first total capacity and one or more water ballast tanks within a hold collectively having a second total capacity, wherein the second total capacity is equal to or larger than the first total capacity.

A first liquid cargo storage tank, a second liquid cargo storage tank, and a third liquid cargo storage tank within a hold; and a first water ballast tank and a second water ballast tank within the cargo hold.

A first liquid cargo storage tank, a second liquid cargo storage tank, and a third liquid cargo storage tank within a cargo hold; and a first water ballast tank; a second water ballast tank; a third water ballast tank, a fourth water ballast tank and fifth water ballast tank within the cargo hold.

Each water ballast tank is elongated and extends along a water ballast tank axis.

The second and fourth water ballast tanks are adjacent a first side of the hull, the third and fifth water ballast tanks are adjacent the second side of hull, and the first water ballast tank is disposed along the centerline plane.

The fourth and fifth water ballast tanks are positioned above the second and third liquid cargo storage tanks; and the first, second and third water ballast tanks are positioned below the second and third liquid cargo storage tanks.

A water ballast system within each cargo hold.

A water ballast system within each cargo hold and adjacent the liquid cargo storage tanks within the cargo hold.

The water ballast system within each hold comprises a plurality of water ballast tanks.

The water ballast system within each hold comprises at least a first water ballast tank, a second water ballast tank, a third water ballast tank, a fourth water ballast tank, and a fifth water ballast tank.

A water ballast system comprising at least one water ballast pump, at least one liquid cargo pump, a water flow meter and/or tank fluid level sensor, a liquid cargo flow meter and/or tank fluid level sensor, and possibly draft and other sensors.

The water ballast system further comprises a controller interconnected to each of the at least one water ballast pump, at least one liquid cargo pump, a water ballast flow meter and/or tank fluid level sensor, and a liquid cargo flow meter and/or tank fluid level sensor, possibly in concert with draft and other sensors, wherein the controller can compare the volume of water ballast flow to the volume of liquid cargo flow and adjust the at least one water ballast pump, at least one liquid cargo pump based on the compared volumes (and possibly also draft).

A water ballast system comprising a plurality of water ballast pumps, a plurality of liquid cargo pumps, a water ballast flow meter(s) and/or tank fluid level sensor(s) disposed to measure water flow through the plurality of water ballast pumps, a liquid cargo flow meter(s) and/or tank fluid level sensor(s) disposed to measure liquid cargo flow through the plurality of liquid cargo pumps.

The water ballast system further comprises a controller interconnected to each of the plurality of water ballast pumps, plurality of liquid cargo pumps, the water ballast flow meter(s) and/or tank fluid level sensor(s), and the liquid cargo flow meter(s) and/or tank fluid level sensor(s), possibly in concert with draft and other sensors, wherein the controller can compare the volume of water ballast flow to the volume of liquid cargo flow and adjust the plurality of water ballast pumps and the plurality of liquid cargo pumps based on the compared volumes (and possibly also draft).

The controller of the water ballast system operates each pump separately.

Likewise, various methods for operating a marine vessel have been described. In one or more embodiments, the methods may include docking a carbon dioxide transport and sequestration marine vessel at a first location adjacent a source of gaseous carbon dioxide; loading gaseous carbon dioxide to the carbon dioxide transport and sequestration marine vessel; liquifying the loaded gaseous carbon dioxide; storing the liquified carbon dioxide in storage tanks on the carbon dioxide transport and sequestration marine vessel; transporting the liquified carbon dioxide to a second location; pressurizing the stored liquified carbon dioxide to produce supercritical carbon dioxide; and injecting the supercritical carbon dioxide into a reservoir. In other embodiments, the methods may include docking a carbon dioxide transport and sequestration marine vessel at a first location adjacent a source of gaseous carbon dioxide; loading gaseous carbon dioxide to the carbon dioxide transport and sequestration marine vessel; liquifying the loaded gaseous carbon dioxide; storing the liquified carbon dioxide in storage tanks on the carbon dioxide transport and sequestration marine vessel; transporting the liquified carbon dioxide to a second location; pressurizing the stored liquified carbon dioxide to produce supercritical carbon dioxide; and offloading the supercritical carbon dioxide at the second location. In other embodiments, the methods may include docking a carbon dioxide transport and sequestration marine vessel at a first location adjacent a source of gaseous carbon dioxide; loading gaseous carbon dioxide to the carbon dioxide transport and sequestration marine vessel; liquifying the loaded gaseous carbon dioxide; storing the liquified carbon dioxide in storage tanks on the carbon dioxide transport and sequestration marine vessel; transporting the liquified carbon dioxide to a second location; and offloading the liquified carbon dioxide at the second location. In one or more embodiments, the methods may include docking a carbon dioxide transport and sequestration marine vessel at a first location adjacent a source of liquid carbon dioxide; loading liquid carbon dioxide to the carbon dioxide transport and sequestration marine vessel; storing the liquified carbon dioxide in storage tanks on the carbon dioxide transport and sequestration marine vessel; transporting the liquid carbon dioxide to a second location; pressurizing the stored liquid carbon dioxide to produce supercritical carbon dioxide; and injecting the supercritical carbon dioxide into a reservoir. In other embodiments, the methods may include docking a carbon dioxide transport and sequestration marine vessel at a first location adjacent a source of liquid carbon dioxide; loading liquid carbon dioxide to the carbon dioxide transport and sequestration marine vessel; storing the liquid carbon dioxide in storage tanks on the carbon dioxide transport and sequestration marine vessel; transporting the liquified carbon dioxide to a second location; pressurizing the stored liquid carbon dioxide to produce supercritical carbon dioxide; and offloading the supercritical carbon dioxide at the second location. In other embodiments, the methods may include docking a carbon dioxide transport and sequestration marine vessel at a first location adjacent a source of liquid carbon dioxide; loading liquid carbon dioxide to the carbon dioxide transport and sequestration marine vessel; storing the liquid carbon dioxide in storage tanks on the carbon dioxide transport and sequestration marine vessel; transporting the liquified carbon dioxide to a second location; and offloading the liquified carbon dioxide at the second location. In one or more embodiments, the methods may include docking a carbon dioxide transport and sequestration marine vessel at a first location adjacent a source of gaseous carbon dioxide; loading gaseous carbon dioxide to the carbon dioxide transport and sequestration marine vessel; storing the gaseous carbon dioxide in temporary storage tanks on the carbon dioxide transport and sequestration marine vessel transporting the liquified carbon dioxide to one or more further locations and docking a carbon dioxide transport and sequestration marine vessel at these locations adjacent a source of gaseous carbon dioxide; loading gaseous carbon dioxide to the carbon dioxide transport and sequestration marine vessel; liquifying the loaded gaseous carbon dioxide; storing the liquified carbon dioxide in storage tanks on the carbon dioxide transport and sequestration marine vessel; transporting the liquified carbon dioxide to a final location; pressurizing the stored liquified carbon dioxide to produce supercritical carbon dioxide; and injecting the supercritical carbon dioxide into a reservoir. In other embodiments, the methods may include docking a carbon dioxide transport and sequestration marine vessel at a first location adjacent a source of gaseous carbon dioxide; loading gaseous carbon dioxide to the carbon dioxide transport and sequestration marine vessel; storing the gaseous carbon dioxide in temporary storage tanks on the carbon dioxide transport and sequestration marine vessel transporting the liquified carbon dioxide to one or more further locations and docking a carbon dioxide transport and sequestration marine vessel at these locations adjacent a source of gaseous carbon dioxide; loading gaseous carbon dioxide to the carbon dioxide transport and sequestration marine vessel; liquifying the loaded gaseous carbon dioxide; storing the liquified carbon dioxide in storage tanks on the carbon dioxide transport and sequestration marine vessel; transporting the liquified carbon dioxide to a final location; pressurizing the stored liquified carbon dioxide to produce supercritical carbon dioxide; and offloading the supercritical carbon dioxide at the final location. In other embodiments, the methods may include docking a carbon dioxide transport and sequestration marine vessel at a first location adjacent a source of gaseous carbon dioxide; loading gaseous carbon dioxide to the carbon dioxide transport and sequestration marine vessel; storing the gaseous carbon dioxide in temporary storage tanks on the carbon dioxide transport and sequestration marine vessel transporting the liquified carbon dioxide to one or more further locations and docking a carbon dioxide transport and sequestration marine vessel at these locations adjacent a source of gaseous carbon dioxide; loading gaseous carbon dioxide to the carbon dioxide transport and sequestration marine vessel; liquifying the loaded gaseous carbon dioxide; storing the liquified carbon dioxide in storage tanks on the carbon dioxide transport and sequestration marine vessel; transporting the liquified carbon dioxide to a final location; and offloading the liquified carbon dioxide at the final location. In other embodiments, the methods may include docking a marine vessel at a first location adjacent a source of gaseous carbon dioxide and/or a source of liquid carbon dioxide; loading at least one of gaseous carbon dioxide or liquid carbon dioxide onto the marine vessel; liquifying any loaded gaseous carbon dioxide to produced liquefied carbon dioxide; storing the liquified carbon dioxide in storage tanks on the marine vessel; transporting the liquified carbon dioxide to a second location; mooring the marine vessel at the second location; offloading the liquified carbon dioxide at the second location. In other embodiments, the methods may include docking a marine vessel at a first location adjacent a source of liquid cargo; loading liquid cargo onto the marine vessel into a plurality of liquid cargo storage tanks disposed within a plurality of separate cargo holds within the marine vessel; and during loading of the liquid cargo, offloading water ballast from each cargo hold in which liquid cargo is loaded. In other embodiments, the methods may include docking a marine vessel at a location adjacent a source of liquid cargo; loading liquid cargo onto the marine vessel into a plurality of liquid cargo storage tanks disposed within a plurality of separate cargo holds within the marine vessel; and during loading of the liquid cargo, offloading water ballast from each cargo hold in which liquid cargo is loaded, wherein the total weight of water ballast offloaded is substantially equivalent to the total weight of liquid cargo loaded onto the marine vessel. In other embodiments, the methods may include docking a marine vessel at a first location adjacent a source of liquid cargo; loading liquid cargo onto the marine vessel in a plurality of liquid cargo storage tanks disposed within a plurality of separate cargo holds within the marine vessel; during loading of the liquid cargo, offloading water ballast from each cargo hold in which liquid cargo is loaded; transporting the liquid cargo to a second location; offloading liquid cargo at the second location; and during offloading of the liquid cargo, loading water ballast into each cargo hold from which liquid cargo is offloaded. In other embodiments, the methods may include docking a marine vessel at a location adjacent a liquid cargo manifold; offloading liquid cargo to the manifold from a plurality of liquid cargo storage tanks disposed within a plurality of separate cargo holds within the marine vessel; and during offloading of the liquid cargo, loading water ballast to each cargo hold from which liquid cargo is offloaded, wherein the total weight of water ballast loaded is substantially equivalent to the total weight of liquid cargo offloaded from the marine vessel. In other embodiments, the methods may include docking a marine vessel at a first location adjacent a source of liquid cargo; loading liquid cargo onto the marine vessel into a plurality of liquid cargo storage tanks disposed within a plurality of separate cargo holds within the marine vessel; and during loading of the liquid cargo, offloading water ballast from each cargo hold in which liquid cargo is loaded, wherein the total weight of water ballast offloaded is substantially equivalent to the total weight of liquid cargo loaded onto the marine vessel; transporting the loaded liquid cargo to a second location; offloading liquid cargo at the second location from a plurality of liquid cargo storage tanks disposed within a plurality of separate cargo holds within the marine vessel; and during offloading of the liquid cargo, loading water ballast to each cargo hold from which liquid cargo is offloaded, wherein the total weight of water ballast loaded is substantially equivalent to the total weight of liquid cargo offloaded from the marine vessel. In other embodiments, the methods may include positioning a marine vessel at a location adjacent a source of liquid cargo; loading liquid cargo onto the marine vessel into at least one liquid cargo storage tank disposed within each of at least two separate cargo holds within the marine vessel; and during loading of the liquid cargo, offloading water ballast from each cargo hold in which liquid cargo is loaded, wherein the total weight of water ballast offloaded from each cargo hold is proportional to the total weight of liquid cargo loaded onto the marine vessel in each cargo hold based on the density of the water ballast and the density of the liquid cargo. In other embodiments, the methods may include loading liquid cargo onto a marine vessel into at least two liquid cargo storage tanks disposed within at least one cargo hold within the marine vessel; and during loading of the liquid cargo, offloading water ballast from the cargo hold in which liquid cargo is loaded, wherein the total weight of water ballast offloaded from the cargo hold is proportional to the total weight of liquid cargo loaded onto the marine vessel in the cargo hold based on the density of the water ballast and the density of the liquid cargo.

The foregoing embodiments of operating a marine vessel may include one or more of the following elements alone or in combination with any other elements:

- The offloading of the water ballast occurs simultaneously with the loading of the liquid cargo.
- Loading liquid cargo comprises pumping a gaseous cargo onboard the marine vessel, liquifying the gaseous cargo to produce a cryogenic cargo, and storing the cryogenic cargo in one or more liquid cargo storage tanks onboard the marine vessel.
- Offloading water ballast comprises pumping water ballast from a plurality of separate water ballast tanks disposed within the at least two separate cargo holds.
- Transporting the loaded liquid cargo to a second location; offloading liquid cargo at the second location from at least one liquid cargo storage tank disposed within one of the at least two separate cargo holds; and during offloading of the liquid cargo, loading water ballast to each cargo hold from which liquid cargo is offloaded, wherein the total weight of water ballast loaded to a cargo hold is proportional to the total weight of liquid cargo offloaded from the cargo hold based on the density of the water ballast and the density of the liquid cargo.
- Maintaining as constant at least one condition of the marine vessel during loading of liquid cargo, where the at least one condition is selected from the group consisting of waterline, deadweight distribution, hull girder loading.
- Maintaining as constant at least one condition of the marine vessel during loading of liquid cargo, where the at least one condition is selected from the group consisting of waterline, deadweight distribution, hull girder loading, wherein the offloading of the water ballast occurs simultaneously with the loading of the liquid cargo.
- Measuring a condition of the water ballast being offloading of the water ballast and measuring a condition of the liquid cargo being loaded, and adjusting the flowrate of at least one of the water ballast and liquid cargo, where the measured condition is selected from the group consisting of flowrate of water ballast, flow rate of liquid cargo, water ballast liquid level within a water ballast tank and liquid cargo liquid level within a liquid cargo tank.

Offloading liquid cargo from at least one liquid cargo storage tank disposed within a cargo hold; and during offloading of the liquid cargo, loading water ballast to the cargo hold from which liquid cargo is offloaded, wherein the loading of water ballast comprises pumping water ballast to a plurality of spaced apart water ballast tanks disposed within the cargo hold in order to mimic the hull girder loading of the marine vessel as it existed prior to offloading the liquid cargo.

Offloading water ballast comprises pumping water ballast from a plurality of spaced apart water ballast tanks adjacent the at least two liquid cargo storage tanks in order to maintain the deadweight distribution of the marine vessel during loading of the liquid cargo.

Offloading the liquified carbon dioxide at the second location comprises pressurizing the stored liquified carbon dioxide to produce supercritical carbon dioxide; and transferring the supercritical carbon dioxide to a storage facility.

Transferring to a storage facility comprises injecting the supercritical carbon dioxide into the subsea reservoir The second location is adjacent a subsea reservoir.

The storage facility is a reservoir.

The reservoir is a subsea reservoir.

The storage facility is an onshore storage facility.

The source of gaseous carbon dioxide is an onshore pipeline.

The source of gaseous carbon dioxide is an offshore pipeline.

The first location is adjacent the shoreline and the source of gaseous carbon dioxide is an onshore pipeline.

The first location is adjacent the shoreline and the source of liquid carbon dioxide is an onshore pipeline.

The first location is a loading port with access to a source of gaseous carbon dioxide.

The first location is a loading port with access to a source of liquid carbon dioxide.

The first location is adjacent a source of gaseous carbon dioxide.

The first location is adjacent a gaseous carbon dioxide pipeline.

The first location is adjacent an offshore loading port for a gaseous carbon dioxide pipeline.

Loading gaseous carbon dioxide comprises coupling a gas manifold of the marine vessel to the gaseous carbon dioxide source.

Loading liquid carbon dioxide comprises coupling a liquid manifold of the marine vessel to the liquid carbon dioxide source.

The second location is remote from the first location.

The second location is above or in the vicinity of a subsea (depleted) hydrocarbon reservoir.

The second location is adjacent an offshore injection terminal.

The second location is a nearshore location in the vicinity of a storage facility, industrial consumer, etc.

The second location is an offloading port.

The offshore injection terminal is a marine platform.

The marine platform is one of a jack-up platform, a semi-submersible platform, a barge, a buoyant vessel, a fixed platform, a spar platform, and a tension-leg platform.

Transporting the liquified carbon dioxide to a second location further comprises moving the marine vessel to one or more intermediary locations, and at each intermediary location, loading additional gaseous carbon dioxide to the marine vessel; liquifying the loaded additional gaseous carbon dioxide; and storing the liquified additional carbon dioxide in storage tanks on the marine vessel.

Moving the marine vessel to a plurality of intermediary locations prior to moving the marine vessel to the second location.

Loading gaseous carbon dioxide comprises initiating a continuous flow of gaseous carbon dioxide from the source to the marine vessel for period of time.

The gaseous carbon dioxide is liquified to approximately minus 28 degrees Celsius or colder.

The gaseous carbon dioxide is pressurized to at least 15 bar.

The liquified carbon dioxide is stored at least minus 28 degrees Celsius or colder.

The liquified carbon dioxide is stored at least 15 bar.

The liquified carbon dioxide is pressurized to at least 200 bar.

The first location is a loading port marine manifold.

The first location is a nearshore marine manifold.

The first location is an offshore marine manifold.

The first location is a submerged buoy.

The first location is an above-water coupling system.

Loading liquid carbon dioxide and storing the onboarded liquified carbon dioxide in storage tanks on the marine vessel.

Transporting the liquified carbon dioxide to a second location further comprises moving the marine vessel to one or more intermediary locations, and at each intermediary location, loading additional liquid carbon dioxide to the marine vessel; and storing the liquified additional carbon dioxide in storage tanks on the marine vessel.

Loading liquid carbon dioxide comprises initiating a continuous flow of liquid carbon dioxide from the source to the marine vessel for period of time.

The loaded liquid carbon dioxide is cooled to at least minus 28 degrees Celsius or colder.

The loaded liquid carbon dioxide is pressurized to at least 15 bar.

The supercritical carbon dioxide at least 180 bar and 5 to 25 degrees Celsius.

The supercritical carbon dioxide at least 200 bar and 10 to 30 degrees Celsius.

The liquid carbon dioxide is pressurized to at least 200 bar.

The liquid carbon dioxide is pressurized to at least 73.8 bar.

The liquid carbon dioxide is at least minus 31 degrees Celsius or colder.

The supercritical carbon dioxide is pumped to the injection wellhead as a liquid.

Injecting the supercritical carbon dioxide into a reservoir comprises pumping the supercritical carbon dioxide to an injection wellhead of an underground reservoir.

Injecting the supercritical carbon dioxide into a reservoir comprises interconnecting the marine vessel to an injection wellhead.

Offloading comprises injecting the supercritical carbon dioxide into a storage reservoir.

The reservoir is a depleted or semi-depleted hydrocarbon reservoir or hydrocarbon reservoir that has otherwise reached its end of life with respect to hydrocarbon production.

Pumping liquified carbon dioxide into the storage tanks following liquification.

Maintaining a constant waterline for the marine vessel during operations.

Maintaining a constant deadweight distribution for the marine vessel during operations.

Maintaining a constant waterline for the marine vessel during loading, transporting and offloading.

Maintaining a constant deadweight distribution for the marine vessel during loading, transporting and offloading.

Maintaining a constant waterline for the marine vessel during loading, transporting and injecting.

Maintaining a constant deadweight distribution for the marine vessel during loading, transporting and injecting.

Maintaining constant initial and high angle stability characteristics for the marine vessel during operations.

Maintaining constant initial and high angle stability characteristics for the marine vessel during loading, transporting and offloading.

Maintaining constant initial and high angle stability characteristics for the marine vessel during loading, transporting and injecting.

Maintaining constant still water hull girder loading (shearing force and bending moment) characteristics for the marine vessel during operations.

Maintaining constant still water hull girder loading (shearing force and bending moment) characteristics for the marine vessel during loading, transporting and offloading.

Maintaining constant still water hull girder loading (shearing force and bending moment) characteristics for the marine vessel during loading, transporting and injecting.

Maintaining constant motion characteristics for the marine vessel during operations.

Maintaining constant motion characteristics for the marine vessel during loading, transporting and offloading.

Maintaining constant motion characteristics for the marine vessel during loading, transporting and injecting.

Modifying the waterline and/or deadweight distribution in order to detune the motion characteristics for the marine vessel during operations.

Modifying the waterline and/or deadweight distribution in order to detune the motion characteristics for the marine vessel during loading, transporting and offloading.

Modifying the waterline and/or deadweight distribution in order to detune the motion characteristics for the marine vessel during loading, transporting and injecting.

During the step of loading, removing water ballast from the marine vessel as liquified carbon dioxide is pumped into the storage tanks.

During the step of offloading, filling water ballast tanks on the marine vessel as supercritical carbon dioxide is pumped from the marine vessel.

Replacing supercritical carbon dioxide with an equivalent amount by weight and distribution of water ballast.

Replacing supercritical carbon dioxide with an equivalent amount by weight but different distribution of water ballast.

Replacing supercritical carbon dioxide with a different amount by weight but same distribution of water ballast.

Replacing supercritical carbon dioxide with a different amount by weight and different distribution of water ballast.

During the step of loading consumable bunkers and/or removing waste fluids, removing and/or filling water ballast from/on the marine vessel as consumables (fuels, oils, waters, etc.) are pumped into the bunker and/or from the collection tanks.

During the step of running onboard engines and other systems during loading, transporting and injecting and hence consuming bunkers and producing waste fluids, filling and/or removing water ballast on the marine vessel as consumables (fuels, oils, waters, etc.) are pumped from the bunker and/or to the collection tanks.

During the step of offloading consumable bunkers and waste fluids, filling water ballast on the marine vessel as consumables (fuels, oils, waters, etc.) are pumped from the bunker and/or from the collection tanks.

Replacing unloaded liquid cargo with an equivalent amount by weight of water ballast.

Replacing unloaded liquid cargo with an equivalent amount by weight and distribution of water ballast.

Replacing unloaded liquid cargo with an equivalent amount by weight but different distribution of water ballast.

Replacing unloaded liquid cargo with a different amount by weight but same distribution of water ballast.

Replacing unloaded liquid cargo with a different amount by weight and different distribution of water ballast.

Unloading liquid cargo and replacing the unloaded liquid cargo with water ballast, wherein the replacing occurs simultaneously with the unloading of the liquid cargo.

Pumping water ballast onboard the marine vessel to replace an equivalent amount by weight and distribution of liquified carbon dioxide.

Pumping water ballast onboard the marine vessel to replace an equivalent amount by weight of unloaded liquified carbon dioxide.

Pumping water ballast onboard the marine vessel to replace an equivalent amount by weight of liquified carbon dioxide but with a different distribution.

Pumping water ballast onboard the marine vessel to replace a different amount by weight of liquified carbon dioxide but with the same distribution.

Pumping water ballast onboard the marine vessel to replace a different by weight and distribution of liquified carbon dioxide.

Loading a gaseous cargo onboard the marine vessel, liquifying the gaseous cargo loaded onboard the marine vessel to produce liquified cargo, and pumping an equivalent amount by weight of water ballast off the marine vessel as the liquified cargo is produced.

Pumping water ballast off the marine vessel as an equivalent amount by weight and distribution of liquified carbon dioxide stored on the marine vessel.

Pumping water ballast off the marine vessel as an equivalent amount by weight of liquified carbon dioxide is stored on the marine vessel.

Pumping water ballast off the marine vessel as an equivalent amount by weight of liquified carbon dioxide is stored on the marine vessel but with a different distribution.

Pumping water ballast off the marine vessel as a different amount by weight of liquified carbon dioxide is stored on the marine vessel but with the same distribution.

Pumping water ballast off the marine vessel as a different amount by weight and distribution of liquified carbon dioxide is stored on the marine vessel.

Pumping water ballast onboard the marine vessel to replace an equivalent amount by weight and distribution of consumable bunkers and/or waste fluids.

Pumping water ballast onboard the marine vessel to replace an equivalent amount by weight of consumable bunkers and/or waste fluids but with a different distribution.

As required, pumping water ballast onboard the marine vessel to replace a different amount by weight of consumable bunkers and/or waste fluids but with the same distribution.

Pumping water ballast onboard the marine vessel to replace a different amount by weight and distribution of consumable bunkers (fuels, oils, waters, etc.) and/or waste fluids.

Pumping water ballast off the marine vessel as an equivalent amount by weight of consumable bunkers (fuels, oils, waters, etc.) is stored and/or waste fluids produced on the marine vessel.

Pumping water ballast off the marine vessel as an equivalent amount by weight of consumable bunkers is stored and/or waste fluids produced on the marine vessel but with a different distribution.

Pumping water ballast off the marine vessel as an equivalent amount by weight of consumable bunkers is stored and/or waste fluids produced on the marine vessel but with the same distribution.

Pumping water ballast off the marine vessel as a different amount by weight and distribution of consumable bunkers is stored and/or waste fluids produced on the marine vessel.

A water ballast system is operated to simultaneously operate a water ballast pump and a liquid carbon dioxide pump in order to maintain a constant waterline (and deadweight distribution of the marine vessel.

Simultaneously operating a water ballast pump and a liquid carbon dioxide pump to maintain a constant waterline and deadweight distribution of the marine vessel.

A water ballast system is operated to simultaneously operate a water ballast pump(s) and a consumables bunker and/or waste fluids pump(s) in order to maintain a constant waterline and deadweight distribution of the marine vessel.

Simultaneously operating a water ballast pump(s) and a consumables bunker and/or waste fluids pump(s) to maintain a constant waterline and deadweight distribution of the marine vessel.

A water ballast system is operated to simultaneously operate a water ballast pump(s) and a liquid carbon dioxide pump(s) in order to maintain constant initial and high angle stability characteristics for the marine vessel.

Simultaneously operating a water ballast pump(s) and a liquid carbon dioxide pump(s) to maintain constant initial and high angle stability characteristics of the marine vessel.

A water ballast system is operated to simultaneously operate a water ballast pump(s) and a consumables bunker and/or waste fluids pump(s) in order to maintain constant initial and high angle stability characteristics for the marine vessel.

Simultaneously operating a water ballast pump(s) and a consumables bunker and/or waste fluids pump(s) to maintain constant initial and high angle stability characteristics of the marine vessel.

A water ballast system is operated to simultaneously operate a water ballast pump(s) and a liquid carbon dioxide pump(s) in order to maintain constant still water shearing force and bending moment characteristics for the marine vessel.

Simultaneously operating a water ballast pump(s) and a liquid carbon dioxide pump(s) to maintain constant still water shearing force and bending moment characteristics of the marine vessel.

A water ballast system is operated to simultaneously operate a water ballast pump(s) and a consumables bunker and/or waste fluids pump(s) in order to maintain constant still water shearing force and bending moment characteristics for the marine vessel.

Simultaneously operating a water ballast pump(s) and a consumables bunker and/or waste fluids pump(s) to maintain constant still water shearing force and bending moment characteristics of the marine vessel.

A water ballast system is operated to simultaneously operate a water ballast pump(s) and a liquid carbon dioxide pump(s) in order to maintain constant motion characteristics for the marine vessel.

Simultaneously operating a water ballast pump(s) and a liquid carbon dioxide pump(s) to maintain constant motion characteristics of the marine vessel.

A water ballast system is operated to simultaneously operate a water ballast pump(s) and a consumables bunker and/or waste fluids pump(s) in order to maintain constant motion characteristics for the marine vessel.

Simultaneously operating a water ballast pump(s) and a consumables bunker and/or waste fluids pump(s) to maintain constant motion characteristics of the marine vessel.

Simultaneously operating one or more water ballast pump(s) and one or more liquid carbon dioxide pump(s) in order to modify the waterline and/or deadweight distribution to detune motion characteristics for the marine vessel.

Simultaneously operating one or more water ballast pump(s) and one or more liquid carbon dioxide pump(s) in order to modify the waterline and/or deadweight distribution to detune motion characteristics of the marine vessel.

Simultaneously operating one or more water ballast pump(s) and one or more consumables bunker and/or waste fluids pump(s) in order to modify the waterline and/or deadweight distribution to detune motion characteristics for the marine vessel.

Simultaneously operating one or more water ballast pump(s) and one or more consumables bunker and/or waste fluids pump(s) to modify the waterline and/or deadweight distribution to detune motion characteristics of the marine vessel.

Utilizing one or more piston engines to operate the marine vessel; capturing exhaust flue gas from the one or more of the piston engines; introducing the captured exhaust flue gas to a carbon dioxide capture system; utilizing heat from a primary heat source other than the piston engines to release gaseous carbon from the carbon dioxide capture system.

Utilizing one or more piston engines to operate the marine vessel; capturing exhaust flue gas from the one or more of the piston engines; introducing the captured exhaust flue gas to a carbon dioxide capture system; utilizing heat from one or more gas turbines to release gaseous carbon from the carbon dioxide capture system.

Utilizing heat from a plurality of gas turbines to release gaseous carbon from the carbon dioxide capture system.

Saturating an aqueous solution with gaseous carbon dioxide from the exhaust flue gas of piston engines of the marine vessel; and releasing gaseous carbon dioxide from the saturated flue gas utilizing heat from one or more gas turbines powering equipment on the marine vessel.

Saturating an aqueous solution with gaseous carbon dioxide from the exhaust flue gas of one heat source on the marine vessel; and releasing gaseous carbon dioxide from the saturated flue gas utilizing heat from a different heat source on the marine vessel.

Storing the released gaseous carbon dioxide on board the marine vessel; and liquifying the stored gaseous carbon dioxide scrubbed from the piston engines.

Measuring the flow rate of liquid cargo being loaded on the vessel and measuring the flow rate of water ballast being offloaded from the vessel and adjusting at least one of the water ballast pumps and the liquid cargo pumps so that the volume by weight and distribution of water ballast being offloaded is substantially the same as the volume by weight and distribution of the liquid cargo being loaded.

Measuring the flow rate of liquid cargo being loaded on the vessel and measuring the flow rate of water ballast being offloaded from the vessel and adjusting at least one of the water ballast pumps and the liquid cargo pumps so that the volume by weight of water ballast being offloaded is different to the weight and/or distribution of the liquid cargo being loaded.

Measuring the flow rate of liquid cargo being offloaded from the vessel and measuring the flow rate of water ballast being loaded to the vessel and adjusting at least one of the water ballast pumps and the liquid cargo pumps so that the volume by weight of water ballast being loaded is substantially the same as the volume by weight of the liquid cargo being offloaded.

Measuring the flow rate of liquid cargo being offloaded from the vessel and measuring the flow rate of water ballast being loaded to the vessel and adjusting at least one of the water ballast pumps and the liquid cargo pumps so that the volume by weight and distribution of water ballast being loaded is different to the weight and/or of the liquid cargo being offloaded.

Replacing liquid cargo offloaded from each cargo hold with an equivalent amount by weight and distribution of water ballast loaded into the cargo hold.

Replacing liquid cargo offloaded from each cargo hold with an equivalent amount by weight of water ballast loaded into the cargo hold.

Replacing liquid cargo offloaded from each cargo hold with a different amount by weight and/or distribution of water ballast loaded into the cargo hold.

During the step of loading consumable bunkers and/or removing waste fluids, removing and/or filling water ballast from/on the marine vessel as consumables are pumped into the bunker and/or from the collection tanks.

Replacing with an equivalent amount by weight of water ballast unloaded from the marine vessel with liquid cargo.

Replacing with a different amount by weight and/or distribution of water ballast unloaded from the marine vessel with liquid cargo.

Pumping water ballast onboard to replace an equivalent amount by weight and distribution of liquid cargo offloaded.

Pumping water ballast onboard to replace a different amount by weight and/or distribution of liquid cargo offloaded.

Pumping water ballast off the marine vessel as an equivalent amount by weight and distribution of liquid cargo is stored on the marine vessel.

Pumping water ballast off the marine vessel as an equivalent amount by weight of liquid cargo is stored on the marine vessel.

Pumping water ballast off the marine vessel as a different amount by weight and/or distribution of liquid cargo is stored on the marine vessel.

Pumping water ballast onboard to replace an equivalent amount by weight and distribution of consumable bunkers and/or waste fluids.

Pumping water ballast onboard to replace a different amount by weight and/or distribution of consumable bunkers and/or waste fluids.

The method of any claim, further comprising pumping water ballast off the marine vessel as an equivalent amount by weight and distribution of consumable bunkers (fuels, oils, waters, etc.) is stored on the marine vessel.

Simultaneously operating water ballast pumps and liquid cargo pumps in order to maintain a constant waterline and deadweight distribution for the marine vessel during loading of liquid cargo onto the marine vessel.

Simultaneously operating water ballast pumps and liquid cargo pumps in order to maintain a constant waterline and deadweight distribution for the marine vessel during offloading of liquid cargo from the marine vessel.

A water ballast system is operated to simultaneously operate a water ballast pump(s) and a consumables bunker and/or waste fluids pump(s) in order to maintain a constant waterline and deadweight distribution for the marine vessel.

Simultaneously operating one or more water ballast pump(s) and one or more consumables bunkers and/or waste fluids pump(s) to maintain a constant waterline and deadweight distribution of the marine vessel.

A water ballast system is operated to simultaneously operate a plurality of water ballast pumps and a plurality of liquid cargo pumps in order to maintain constant initial and high angle stability for the marine vessel during offloading of liquid cargo from the marine vessel.

A water ballast system is operated to simultaneously operate a plurality of water ballast pumps and a plurality of liquid cargo pumps in order to maintain constant initial and high angle stability for the marine vessel during loading of liquid cargo to the marine vessel.

Simultaneously operating a water ballast pump(s) and a consumables bunker and/or waste fluids pump(s) to maintain constant initial and high angle stability characteristics of the marine vessel.

Simultaneously operate a water ballast pump(s) and a liquid carbon dioxide pump(s) in order to maintain constant still water shearing force and bending moment characteristics for the marine vessel.

Simultaneously operating a water ballast pump(s) and a liquid carbon dioxide pump(s) to maintain constant still water shearing force and bending moment characteristics of the marine vessel.

A water ballast system is operated to simultaneously operate a water ballast pump(s) and a consumables bunker and/or waste fluids pump(s) in order to maintain constant still water shearing force and bending moment characteristics for the marine vessel.

Simultaneously operating a water ballast pump(s) and a consumables bunker and/or waste fluids pump(s) to maintain constant still water shearing force and bending moment characteristics of the marine vessel.

Simultaneously operating a water ballast pump(s) and a liquid carbon dioxide pump(s) to maintain constant motion characteristics for the marine vessel.

Simultaneously operating a plurality of water ballast pumps and a plurality of liquid cargo pumps in order to maintain constant motion characteristics of the marine vessel.

A water ballast system is operated to simultaneously operate one or more water ballast pump(s) and one or more consumables bunkers and/or waste fluids pump(s) in order to maintain constant motion characteristics for the marine vessel.

Simultaneously operating one or more water ballast pump(s) and one or more consumables bunkers and/or waste fluids pump(s) to maintain constant motion characteristics of the marine vessel.

Simultaneously operating water ballast pumps and liquid cargo pumps in order to modify the waterline and or deadweight distribution for the marine vessel during loading of liquid cargo onto the marine vessel to detune motion characteristics for the marine vessel.

Simultaneously operating water ballast pumps and liquid cargo pumps in order to modify the waterline and or deadweight distribution for the marine vessel during offloading of liquid cargo from the marine vessel to detune motion characteristics for the marine vessel.

A water ballast system is operated to simultaneously operate one or more water ballast pump(s) and one or more consumables bunkers and/or waste fluids pump(s) in order to modify the waterline and or deadweight distribution for the marine vessel to detune motion characteristics for the marine vessel.

Simultaneously operating one or more water ballast pump(s) and one or more consumables bunkers and/or waste fluids pump(s) to modify the waterline and or deadweight distribution of the marine vessel to detune motion characteristics for the marine vessel.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A marine vessel comprising:

a self-propelled, buoyant marine vessel having an elongated hull with a first hull side and an opposing second hull side, a first hull end and a second hull end and defining a centerline plane extending from the first hull end to the second hull end between the two hull sides, substantially bisecting the hull;

a plurality of separate cargo holds defined within the hull, each cargo hold having a cargo hold volume;

at least one liquid storage tank within each of the plurality of separate cargo holds, wherein the liquid storage tanks within each of the plurality of separate cargo holds has a total liquid cargo volume; and one or more water ballast tanks symmetrically arranged about the centerline plane within each of the plurality of cargo holds, wherein the total water ballast volume by weight of the one or more water ballast tanks within each hold is at least 80% of the total liquid cargo volume by weight of the liquid storage tanks within that hold.

2. The marine vessel of claim 1, wherein the total water ballast volume by weight of the one or more water ballast tanks within each of the plurality of separate cargo holds is equal to or greater than the total liquid cargo volume by weight of the liquid storage tanks within said cargo hold.

3. The marine vessel of claim 1, wherein three liquid storage tanks are disposed within each of the plurality of separate cargo holds.

4. The marine vessel of claim 1, wherein a first liquid storage tank is positioned along the centerline plane within each cargo hold, a second liquid storage tank is spaced apart from the centerline plane adjacent the first side of the hull within each hold and a third liquid storage tank is spaced apart from the centerline plane adjacent the second side of the hull within each cargo hold, wherein the first liquid storage tank is positioned above the second and third liquid storage tank within the cargo hold.

5. The marine vessel of claim 1, wherein the at least one liquid storage tank within each of the plurality of separate cargo holds is a cryogenic storage tank having a volume of approximately 3,700 cubic meters at 100% filling ratio.

6. The marine vessel of claim 1, wherein the liquid storage tanks within each of the plurality of separate cargo holds fills at least thirty percent of the cargo hold volume of said cargo hold.

7. The marine vessel of claim 1, wherein a plurality of separate water ballast tanks are disposed within each cargo hold.

8. The marine vessel of claim 7, wherein the plurality of separate water ballast tanks comprises at least a first water ballast tank, a second water ballast tank, a third water ballast tank, a fourth water ballast tank, and a fifth water ballast tank, wherein the plurality of separate water ballast tanks within a cargo hold are spaced apart from one another within said cargo hold.

9. The marine vessel of claim 8, wherein the second and fourth water ballast tanks are adjacent a first side of the hull within each cargo hold, the third and fifth water ballast tanks are adjacent the second side of the hull within each cargo hold, and the first water ballast tank is disposed along the centerline plane within each cargo hold.

10. The marine vessel of claim 8, wherein the fourth and fifth water ballast tanks are positioned above the second and third liquid storage tanks; and the first, second and third water ballast tanks are positioned below the second and third liquid storage tanks.

11. The marine vessel of claim 1, wherein the at least one liquid storage tank within a first hold is a cargo storage tank and the at least one liquid storage tank within a second hold is a consumables storage tank.

12. The marine vessel of claim 7, further comprising a separate water ballast pump for each of the plurality of water ballast tanks within the separate cargo holds; a separate liquid cargo pump for each liquid storage tank within each of the plurality of separate cargo holds; a separate sensor for each water ballast tank and each liquid storage tank within each cargo hold; and a controller interconnected to each of the pumps and disposed to operate water ballast pumps and liquid cargo pumps simultaneously.

13. The marine vessel of claim 12, further comprising one or more draft sensors disposed to measure the draft of marine vessel, wherein the one or more draft sensors are interconnected with the controller and controller.

14. A marine vessel comprising:

a self-propelled, buoyant marine vessel having an elongated hull with a first hull side and an opposing second hull side, a first hull end and a second hull end, with a keel between the first and second hull ends;

an upper deck extending between the hull sides so as to define a volume within the hull;

at least two holds are separately defined within the volume within the hull;

at least two liquid storage tanks deployed in each hold, the liquid storage tanks within a hold having a total liquid tank volume; and a water ballast system within each hold and adjacent to the liquid storage tanks, wherein the water ballast system comprises a plurality of water ballast tanks, the plurality of water ballast tanks within a hold having a total water volume, wherein the total water volume by weight of the water ballast tanks within each hold is at least 80% of the total liquid tank volume by weight of the liquid storage tanks within that hold.

15. The marine vessel of claim 14, wherein the total water ballast volume by weight of the one or more water ballast tanks within each of the plurality of separate holds is equal to or greater than the total liquid cargo volume by weight of the liquid storage tanks within said hold.

16. The marine vessel of claim 14, wherein each liquid storage tank within each hold has a volume of approximately 3,700 cubic meters at 100% filling ratio and the liquid storage tanks within each hold are symmetrically positioned within the hold relative to the keel; and wherein the plurality of water ballast tanks within each hold comprises at least a first water ballast tank, a second water ballast tank, a third water ballast tank, a fourth water ballast tank, and a fifth water ballast tank, wherein the plurality of water ballast tanks within a hold are separate from one another within said hold.

17. A method for operating a marine vessel, the method comprising:

offloading liquid cargo from a marine vessel out of at least one liquid storage tank disposed within each of at least two holds within the marine vessel; and during offloading of the liquid cargo, loading water ballast into each of the holds from which liquid cargo is offloaded, wherein the total weight of water ballast loaded to each hold is proportional to the total weight of liquid cargo offloaded from the marine vessel out of each hold based on the density of the water ballast and the density of the liquid cargo.

18. The method of claim 17, further comprising:

during offloading of the liquid cargo, simultaneously loading water ballast to each hold from which liquid cargo is offloaded, wherein the total weight and distribution of water ballast loaded is substantially equivalent to the total weight and distribution of liquid cargo offloaded from the marine vessel.

19. The method of claim 17, further comprising:

docking a marine vessel at a first location adjacent a source of liquid cargo;

offloading liquid cargo from the marine vessel out of a plurality of liquid storage tanks disposed within each of a plurality of separate holds within the marine vessel;

during offloading of the liquid cargo, simultaneously loading water ballast to each hold from which liquid cargo is offloaded;

transporting the liquid cargo to a second location;

loading liquid cargo at the second location into a plurality of liquid storage tanks disposed within each of a plurality of separate holds within the marine vessel; and during loading of the liquid cargo at the second location, simultaneously offloading water ballast from each hold to which liquid cargo is loaded.

20. The method of claim 17, wherein the weight and distribution of water ballast loaded to each cargo hold is substantially equivalent to the weight and distribution of liquid cargo offloaded from each cargo hold.

21. A method for operating a marine vessel, the method comprising:

loading liquid cargo onto a marine vessel into at least one liquid storage tank disposed within each of at least two holds within the marine vessel; and during loading of the liquid cargo, offloading water ballast from each of the holds in which liquid cargo is loaded, wherein the total weight of water ballast offloaded from each hold is proportional to the total weight of liquid cargo loaded onto the marine vessel in the corresponding hold based on the density of the water ballast and the density of the liquid cargo, wherein loading comprises loading the liquid cargo into a plurality of liquid storage tanks disposed within each of a plurality of separate holds within the marine vessel, the method further comprising transporting the loaded liquid cargo to a second location;

offloading liquid cargo at the second location from the plurality of liquid storage tanks disposed within each of a plurality of separate holds within the marine vessel; and during offloading of the liquid cargo, loading water ballast to each hold from which liquid cargo is offloaded, wherein the total weight of water ballast loaded is substantially equivalent to the total weight of liquid cargo offloaded from the marine vessel.

22. The method of claim 21, wherein loading and offloading at one location occurs simultaneously.

23. The method of claim 22, wherein the total weight and distribution of water ballast loaded is substantially equivalent to the total weight and distribution of liquid cargo offloaded from the marine vessel.

24. A method for operating a marine vessel, the method comprising: loading liquid cargo onto a marine vessel into at least one liquid storage tank disposed within each of at least two holds within the marine vessel;

during loading of the liquid cargo, offloading water ballast from each of the holds in which liquid cargo is loaded, wherein the total weight of water ballast offloaded from each hold is proportional to the total weight of liquid cargo loaded onto the marine vessel in the corresponding hold based on the density of the water ballast and the density of the liquid cargo; and adjusting the flowrate of at least one of liquid cargo being loaded or water ballast being offloaded in order to maintain as constant at least one condition of the marine vessel during loading of liquid cargo, where the at least one condition is selected from the group consisting of waterline, deadweight distribution, hull girder loading, mass inertia, stability, and motions, wherein the off-loading of the water ballast occurs simultaneously with the loading of the liquid cargo.

25. A method for operating a marine vessel, the method comprising:

loading liquid cargo onto a marine vessel into at least one liquid storage tank disposed within each of at least two holds within the marine vessel;

during loading of the liquid cargo, offloading water ballast from each of the holds in which liquid cargo is loaded, wherein the total weight of water ballast offloaded from each hold is proportional to the total weight of liquid cargo loaded onto the marine vessel in the corresponding hold based on the density of the water ballast and the density of the liquid cargo, wherein loading liquid cargo comprises pumping a gaseous cargo onboard the marine vessel, liquifying the gaseous cargo to produce a cryogenic cargo, and storing the cryogenic cargo in one or more liquid storage tanks onboard the marine vessel.

26. A method for operating a marine vessel, the method comprising:

loading cargo onto a marine vessel into at least one cargo hold within the marine vessel; and during loading of the cargo, simultaneously offloading water ballast from the cargo hold in which cargo is loaded, wherein the total weight and distribution of water ballast offloaded from the cargo hold is proportional to the total weight and distribution of cargo loaded onto the marine vessel in the cargo hold based on the density of the water ballast and the weight of the cargo.

27. The method of claim 26, wherein loading cargo comprises loading liquid cargo into at least one liquid storage tank disposed within the at least one cargo hold, and further comprising adjusting the flowrate of at least one of liquid cargo being loaded or water ballast being offloaded in order to maintain as constant at least one condition of the marine vessel during loading of liquid cargo, where the at least one condition is selected from the group consisting of waterline, deadweight distribution, hull girder loading, mass inertia, stability, and motions, wherein the offloading of the water ballast occurs simultaneously with the loading of the liquid cargo.

28. The method of claim 26, wherein offloading water ballast comprises pumping water ballast from a plurality of spaced apart water ballast tanks adjacent cargo at least two cargo holds in order to maintain, or modify, the total weight and deadweight distribution of the marine vessel during loading of the cargo into said cargo holds.

29. The method of claim 26, wherein loading cargo comprises pumping a gaseous cargo onboard the marine vessel, liquifying the gaseous cargo to produce a liquid cargo, and storing the liquid cargo in one or more liquid storage tanks within the at least one cargo hold onboard the marine vessel.

30. The method of claim 26, further comprising offloading cargo from at least two cargo holds; and during offloading of the cargo, loading water ballast to the at least two cargo holds from which cargo is offloaded, wherein the loading of water ballast comprises pumping water ballast to a plurality of spaced apart water ballast tanks disposed within each of the at least two cargo holds in order to either i) mimic at least one of the waterline, deadweight distribution, hull girder loading mass inertia, stability, or motions of the marine vessel as it existed prior to offloading the cargo, or ii) detune the marine vessel from at least one of deadweight distribution, hull girder loading, mass inertia, stability, or motions.

* * * * *